United States Patent
Suder et al.

(10) Patent No.: US 7,068,684 B1
(45) Date of Patent: Jun. 27, 2006

(54) QUALITY OF SERVICE IN A VOICE OVER IP TELEPHONE SYSTEM

(75) Inventors: Eric G. Suder, Plano, TX (US); Harold E. A. Hansen, II, Plano, TX (US)

(73) Assignee: Estech Systems, Inc., Plano, TX (US)

( * ) Notice: Subject to any disclaimer, the term of this patent is extended or adjusted under 35 U.S.C. 154(b) by 877 days.

(21) Appl. No.: 09/775,018

(22) Filed: Feb. 1, 2001

(51) Int. Cl.
*H04L 12/66* (2006.01)
*H04J 1/02* (2006.01)
*H04J 1/14* (2006.01)
*H04M 11/00* (2006.01)

(52) U.S. Cl. ............... 370/493; 370/352; 370/496; 379/93.29; 379/93.09

(58) Field of Classification Search ............ 370/229, 370/352, 353, 401, 230, 389, 493, 494, 495, 370/535, 395.42, 395.21, 433, 443, 444, 370/445
See application file for complete search history.

(56) References Cited

U.S. PATENT DOCUMENTS

| | | | |
|---|---|---|---|
| 5,119,372 A * | 6/1992 | Verbeek | 370/230 |
| 5,751,791 A * | 5/1998 | Chen et al. | 379/88.13 |
| 5,878,120 A * | 3/1999 | O'Mahony | 379/93.09 |
| 5,982,779 A | 11/1999 | Krishnakumar et al. | 370/447 |
| 6,504,926 B1 * | 1/2003 | Edelson et al. | 379/390.01 |
| 6,515,996 B1 * | 2/2003 | Tonnby et al. | 370/401 |
| 6,535,521 B1 * | 3/2003 | Barghouti et al. | 370/462 |
| 6,587,433 B1 * | 7/2003 | Borella et al. | 370/230 |
| 6,678,280 B1 * | 1/2004 | Kim et al. | 370/429 |
| 6,735,209 B1 * | 5/2004 | Cannon et al. | 370/401 |
| 6,760,429 B1 * | 7/2004 | Hung et al. | 379/265.09 |
| 6,785,261 B1 * | 8/2004 | Schuster et al. | 370/352 |
| 6,798,768 B1 * | 9/2004 | Gallick et al. | 370/352 |
| 6,839,341 B1 * | 1/2005 | Nakajima | 370/352 |
| 6,876,648 B1 * | 4/2005 | Lee | 370/353 |

OTHER PUBLICATIONS

Harry Newton, *Newton's Telecom Dictionary*, 16th Edition, copyright 2000, pp. 126-127.

Avaya Communication, "Avaya IP Telephone," available via the Internet at www lucent com/enterprise/solutions/eclips/pdf/black$_{13}$ white_paper pdf, Nov. 9, 2000.

Avaya Communication, "Quality of Service (QoS) considerations with 4600 Series IP Telephones," available via the Internet at www lucent com/enterprise/solutions/eclips/pdf/QoSwhite_paper pdf, Jan. 29, 2000.

* cited by examiner

*Primary Examiner*—Hanh Nguyen
(74) *Attorney, Agent, or Firm*—Kelly K. Kordzik; Winstead Sechrest & Minick P.C.

(57) ABSTRACT

An information handling system comprises a TCP/IP network connecting a hub to a multimedia server and the hub to a data server, and the hub to an IP telephony device that is then coupled to a network device. Data sent from the network device is addressed for transmission to the data server and is transmitted through the IP telephony device to the TCP/IP network. The IP telephony device monitors when an amount of data being received over the network falls below a predetermined threshold. If this occurs, the IP telephony device will send a signal to the multimedia server, which will then generate a congestion signal to send to all or selected IP telephony devices in the network to throttle data being received by the IP telephony devices from their respective connected network devices.

61 Claims, 13 Drawing Sheets

QUALITY OF SERVICE IN A VOICE OVER IP TELEPHONE SYSTEM

TECHNICAL FIELD

The present invention relates in general to information processing systems, and in particular, to the use of Voice over IP technology to transmit voice conversations.

BACKGROUND INFORMATION

Voice over IP ("VoIP") is a relatively recent development that is utilized to transmit voice conversations over a data network using the Internet Protocol ("IP"). Internet Protocol is a part of the TCP/IP family of protocols described in software that tracks the Internet address of nodes, routes outgoing messages, and recognizes incoming messages. Such a data network may be the Internet or a corporate intranet, or any TCP/IP network. There are several potential benefits for moving voice over a data network using IP. First, there is a savings in money compared to the need to use traditional tolled telecommunications networks. Additionally, Voice over IP enables the management of voice and data over a single network. And, with the use of IP phones, moves, adds and changes are easier and less expensive to implement. Moreover, additional and integrated new services, including integrated messaging, bandwidth on demand, voice e-mails, the development of "voice portals" on the Web, simplified setting up and tearing down, and transferring of phone calls are capable.

Using Voice over IP technology, phone systems can communicate with each other over existing TCP/IP data networks typically present between remote offices. This feature alone can eliminate the need for expensive, dedicated circuits between facilities. The shared bandwidth can also be used for voice calls and data communication simultaneously; no bandwidth is dedicated to one or the other.

Another advantage of a Voice over IP system is the ability to implement a phone system over an existing data network that is already connecting workstations within a local area network, such as over an Ethernet. An Ethernet operates over twisted wire and over coaxial cable for connecting computers, printers, workstations, terminals, servers, etc., within the same building or a campus. The Ethernet utilizes frame packets for transmitting information. Voice over IP can utilize such packet switching capabilities to connect IP phones onto the Ethernet. However, the implementation of Voice over IP onto an Ethernet has proven to have some difficulties. Data networks were originally designed to allow for latency (delays) in the delivery of packets between sources and destinations. If a packet became lost, then the Ethernet would go through a re-send protocol to have the packet sent again from the source to the destination, and the data then reassembled at the destination end. With voice (or for that matter, video or any other real-time application), such delays present problems. Real-time applications cannot tolerate significant delays or they no longer become real-time applications. Such quality of service ("QOS") concerns are especially amplified when attempting to implement Voice over IP onto an Ethernet, which utilizes a 10/100 Base T protocol, since it can be affected by bursts of data transfers among the workstations and servers, etc. For example, a large print job or a file access can significantly occupy the bandwidth on such an Ethernet, thus greatly degrading the ability to transmit any real-time information during that data burst. This problem worsens as more and more Voice over IP telephones are added to the network.

Therefore, there is a need in the art for an improved information processing system that can handle multimedia traffic in conjunction with typical bursty data transmissions.

SUMMARY OF THE INVENTION

The present invention addresses the foregoing need by providing an information processing system whereby an IP telephony system is designed to share a network with data devices communicating with a network operating system. In one embodiment, the network is an Ethernet local area network. Because these systems share a common hardware media, there is a possibility to saturate the network. Multimedia traffic can be adversely affected by jitter and latency, while data traffic is typically immune to these types of disruptions. This bandwidth contention requires a suitable quality of service arrangement to give the multimedia traffic priority during peak traffic loads.

More specifically, an IP telephony device will contain two separate media access controllers ("MACs") configured to provide a two-port, layer 2 Ethernet switch. This approach permits one MAC to be connected to the network, while the other MAC is dedicated to a connected network device. This allows all traffic flowing between MACs to be manipulated by a hardware/software approach within the IP telephony device. The quality of service algorithm of the present invention uses this configuration to restrict data traffic to/from the network device during peak traffic conditions, thus providing increased multimedia traffic bandwidth when needed.

In one embodiment of the present invention, voice jitter buffers within each IP telephony device are used to minimize the effects of jitter and latency by providing a buffer of three voice packets. If the bandwidth usage of the Ethernet link becomes too great, the jitter buffer will start to deplete. The IP telephony device will detect this condition and report it to a quality of service task running within a multimedia server coupled to the Ethernet.

If any of the IP telephony devices report to the multimedia server that their jitter buffers have hit a specified threshold, the multimedia server will issue a command to all (or selected) IP telephony devices simultaneously to begin a flow control process between their respective network devices and the network. If, after a programmable interval, the multimedia server ceases receiving quality of service messages from the IP telephony devices, the multimedia server will issue a command to stop the flow control process.

In an embodiment of the present invention, the command that the multimedia server issues to instruct the IP telephony devices to start the flow control process will contain a parameter used to signify how aggressively the IP telephony devices should flow control their respective data paths. For example, the multimedia server would first send the most aggressive value. Once the quality of service messages cease from the IP telephony devices, the multimedia server would then send a next lower aggressive parameter value. If no quality of service messages are received, the multimedia server will turn off the quality of service algorithm. If, however, during any stage if the quality of service messages are received from the IP telephony devices, the multimedia server will reissue the next higher flow control value.

In one embodiment of the present invention, during the quality of service flow control processes, the IP telephony devices may flood the private network between the IP telephony devices and the network devices with idle patterns (jabber). The various levels of flow control needed could be achieved by a jabber duty cycle. For example, a most aggressive value may have an eighty percent duty cycle, while a least aggressive value may have a twenty percent duty cycle. During the jabber process, communication between the network device and server is disrupted, allowing more bandwidth for the voice packets between the IP telephony devices and the multimedia server.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
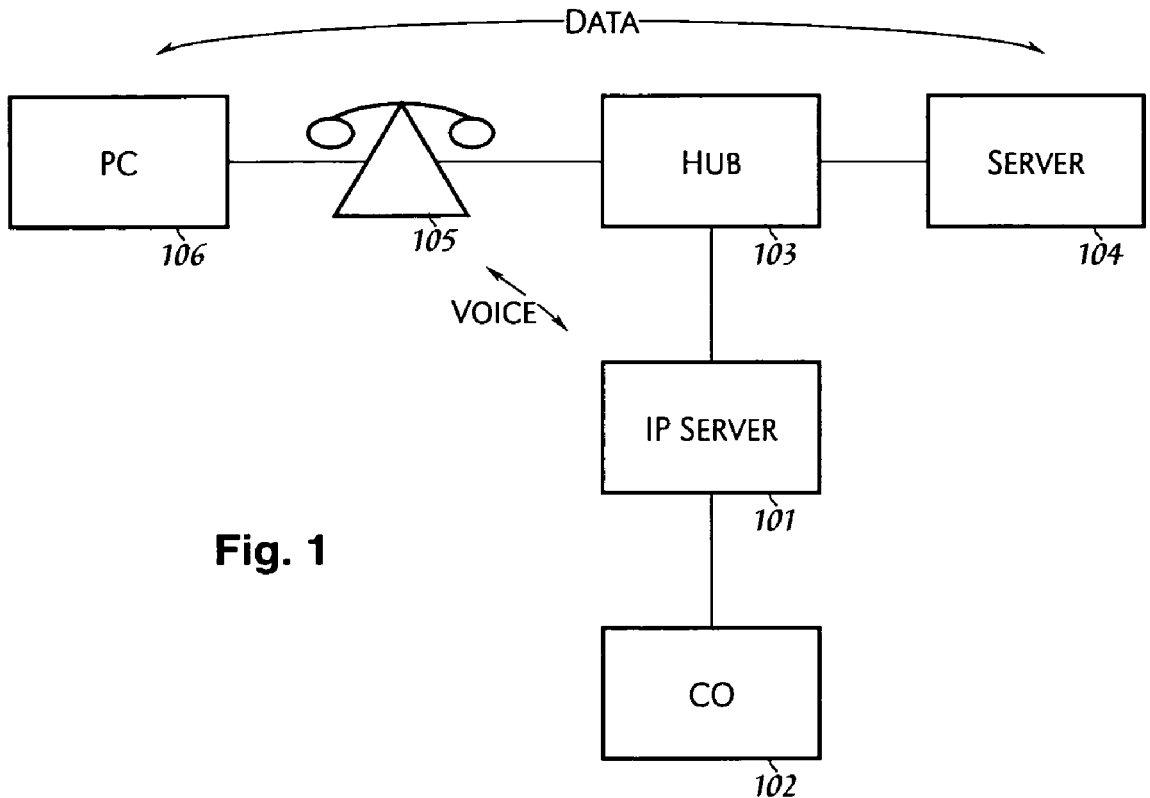
FIG. 1 illustrates an information processing system configured in accordance with the present invention.

In the following description, numerous specific details are set forth such as specific network configurations, network devices, types of multimedia traffic, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 illustrates an information processing system configured in accordance with the present invention. FIG. 1 essentially illustrates a local area network ("LAN"), which in one configuration could be implemented with an Ethernet protocol. However, the present invention is not limited to use with any particular data transfer protocol. Workstation PC 106, network hub 103 and server 104 coupled to each other illustrate a typical LAN configuration where data is communicated between the workstation 106 and the server 104. Naturally, other workstations and servers could also be coupled to the LAN through hub 103, including the use of additional hubs. Hub 103 may be a 10 Base T or 10/100 Base T Ethernet hub. In an alternative embodiment, the hub 103 and server 104 may be implemented in the same data processing system. Herein, the term "workstation" can refer to any network device that can either receive data from a network, transmit data to a network, or both.

To add in the voice communication capabilities, an IP multimedia server 101 is coupled to hub 103 and an IP telephony device 105 is connected between the workstation 106 and the hub 103. The IP multimedia server 101 is coupled to a central office ("CO") 102 so that telephony device 105 can communicate to other telecommunications networks, such as the public switched telephone network ("PSTN"). Naturally, additional IP telephony device 105 can be coupled to hub 103, including having workstations coupled to hub 103 through such IP telephony devices. Further details on multimedia server 101 and IP telephony device 105 are described below. An IP telephone, or telephony device, is any apparatus, device, system, etc., that can communicate multimedia traffic using IP telephony technology. IP telephony is defined within Newton's Telecom Dictionary, Harry Newton, Sixteenth Edition, page 454, which is hereby incorporated by reference herein.

Information, or data, on the network includes both the voice and data information, and any other multimedia traffic. Traffic as a result of the data transmissions between workstation 106 and server 104 affects the bandwidth available for communications between telephony device 105 and multimedia server 101. However, as discussed above, because the multimedia traffic is real-time, it must be transferred with no or minimum latency. An embodiment of the present invention provides a protocol for ensuring that the multimedia data is transferred within a specified minimum or no latency by having the data information pass through the IP telephony device 105 as it is being transferred to/from workstation 106. This configuration, as will be subsequently discussed in further detail, permits the IP telephony device 105 to throttle the data to/from workstation 106, effectively giving the IP telephony device 105 priority on the network.

Figure 2:
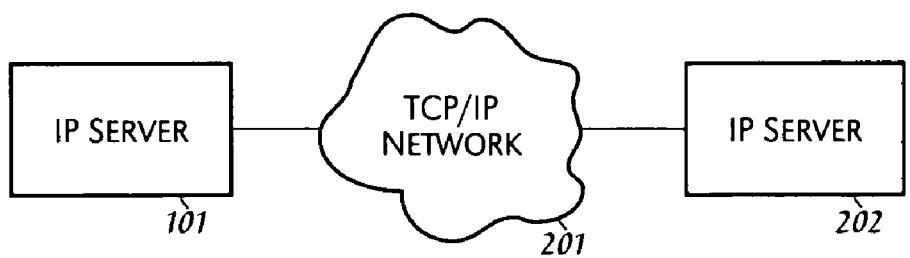
FIG. 2 illustrates a wide area network configuration of the present invention.

FIG. 2 illustrates how the information processing system of the present invention as noted above with respect to FIG. 1 can be implemented across a wide area network ("WAN") 201 where the multimedia server 101 of FIG. 1 is coupled to another multimedia server 202 across LAN 201. Note that the other items described above in FIG. 1 have been omitted in FIG. 2 for the sake of simplicity.

Figure 3:
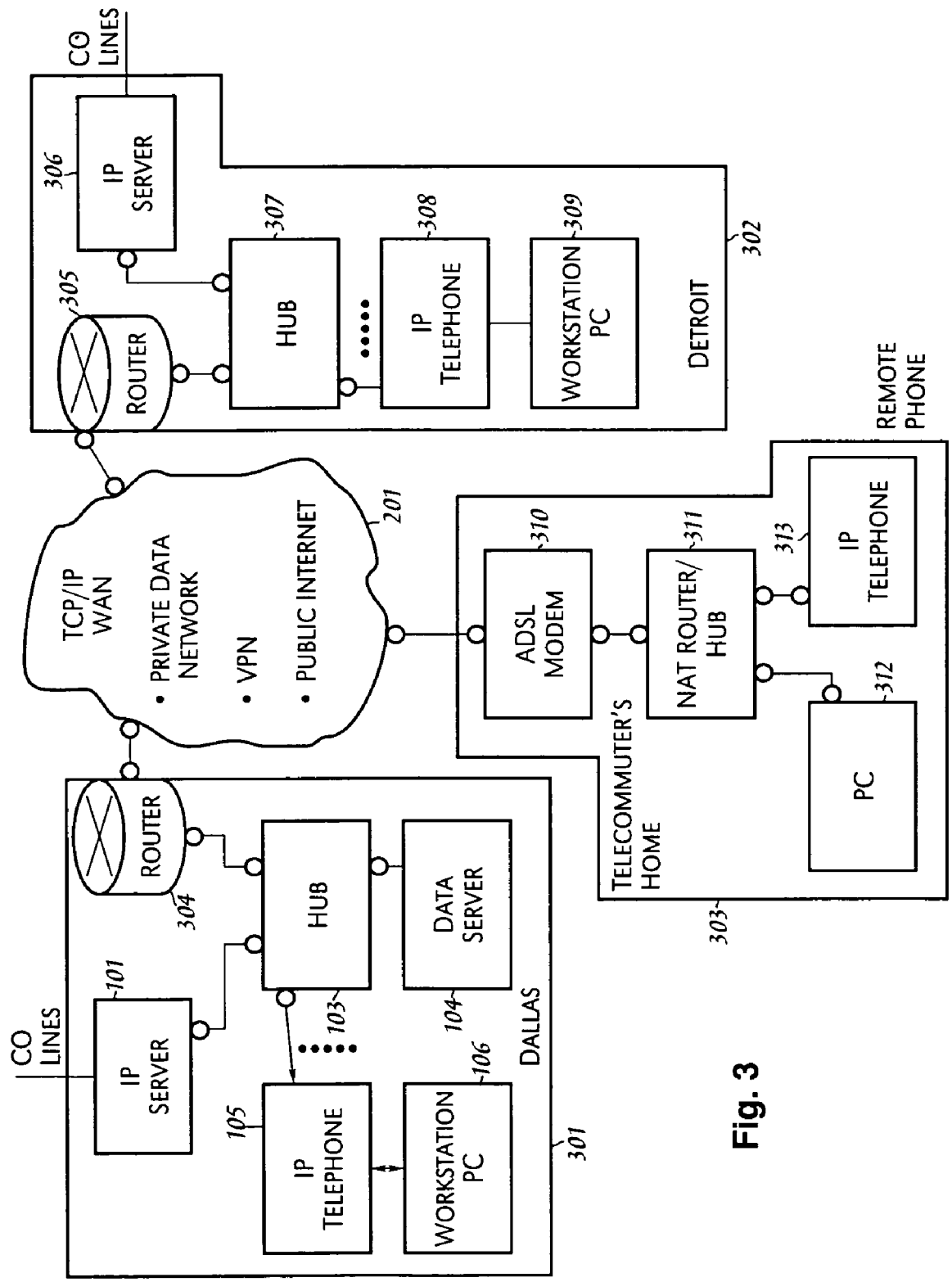
FIG. 3 illustrates another embodiment of a wide area network configuration of the present invention.

FIG. 3 illustrates further detail of a configuration of the present invention over a WAN 201. Note that such a WAN may implement the TCP/IP protocol, and could be a public WAN, such as the Internet, a private data network, an intranet, or a Virtual Private Network ("VPN").

FIG. 3 illustrates an exemplary system where WAN 201 couples an information processing system 301 in Dallas, Tex. to another information processing system 302 in Detroit, Mich., while also permitting a remote system 303 to couple to both systems 301 and 302 through WAN 201, such as from a telecommuter's home.

System 301 is similar to the system described above with respect to FIG. 1. System 301 is coupled to WAN 201 through router 304.

System 302 is similar to system 301 with the exception that a data server is not implemented within system 302. Router 305 is similar to router 304, multimedia server 306 is similar to multimedia server 101, hub 307 is similar to hub 103, IP telephony device 308 is similar to IP telephony device 105, and workstation 309 is similar to workstation 106.

Remote system 303 is coupled to WAN 201 using a modem 310, such as an ADSL (asymmetric digital subscriber line) modem. A NAT (Network Address Translation) router/hub 311 then couples a workstation PC 312 and an IP telephony device 313 to the modem 310. Not only can data be transferred across WAN 201 between systems 301–303, but also any one of telephony devices 105, 308 and 313 can communicate with each other and with the PSTN (not shown) over CO lines coupled to either of systems 301 and 302.

Figure 4:
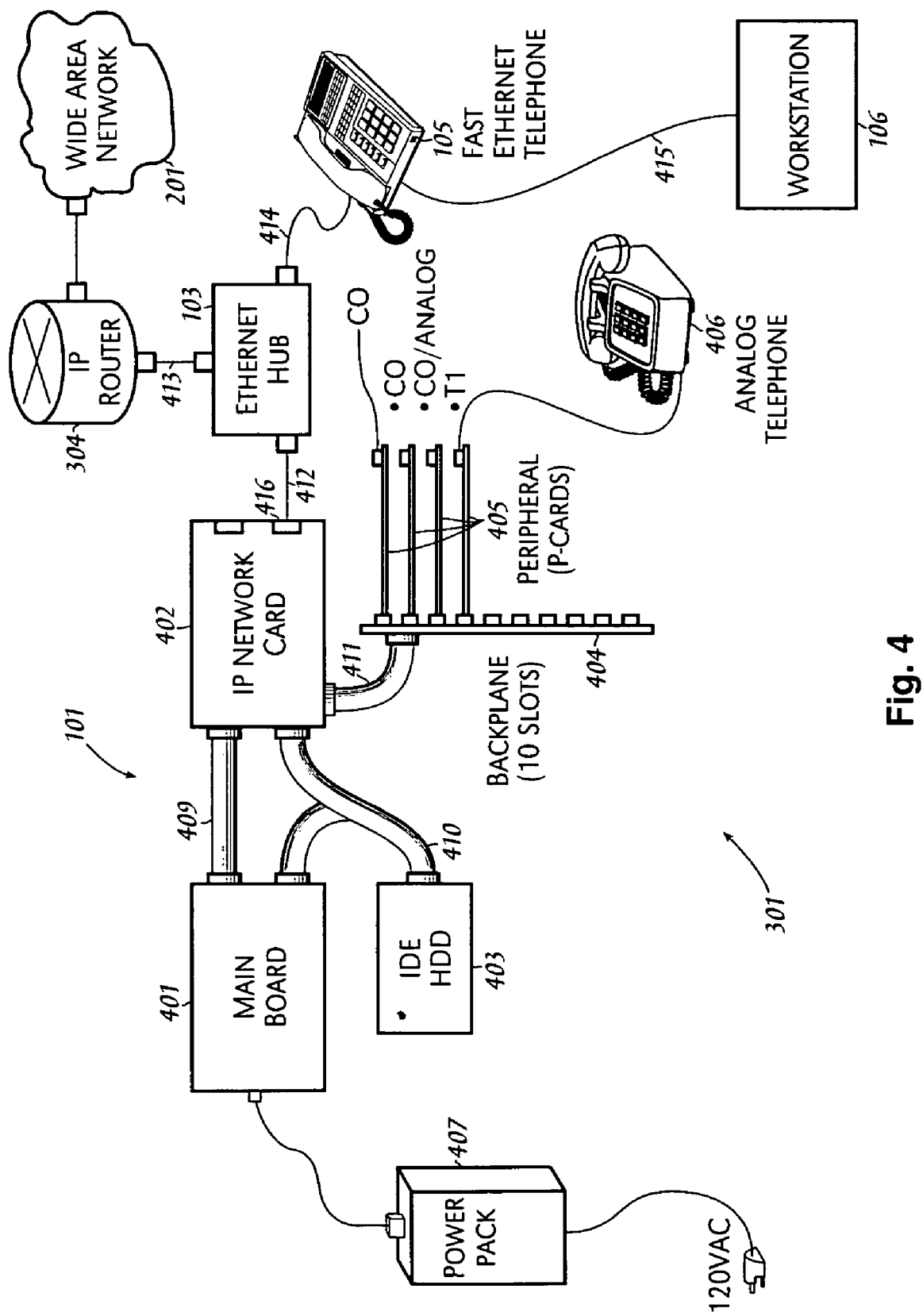
FIG. 4 illustrates a block diagram of a configuration of the present invention.

FIG. 4 illustrates further details of system 301. As noted above, system 301 is coupled to WAN 201 through IP router 304, which is coupled by line 413 to Ethernet hub 103. Ethernet hub 103 is connected by line 414 to fast Ethernet telephony device 105, which is coupled by line 415 to workstation 106. Ethernet hub 103 is coupled to IP network card 402 by connection 416, which may be a 10/100 Base T connector.

Multimedia server 101 is comprised of main board 401, network card 402, hard drive 403, backplane 404 and peripheral cards 405. network card 402 is further discussed below in more detail with respect to FIG. 5. network card 402 is coupled by ribbon cable 409 to main board 401, which is further described below in more detail with respect to FIG. 6. multimedia server 101 is powered through power pack 407. IDE (Integrated Drive Electronics) HDD (hard disk drive) 403 is coupled by ribbon cable 410 to network card 402 and main board 401, while network card 402 is coupled to backplane 404 through ribbon cable 411. Backplane 404 provides capacity for several peripheral cards (P-cards) 405, which are of a typical configuration for enabling a telephone system to connect to a central office (CO), T1 lines, analog central office trunks and analog telephones 406. Alternatively, ribbon cable 411 could be coupled to one of the peripheral cards 405 directly.

Figure 5:
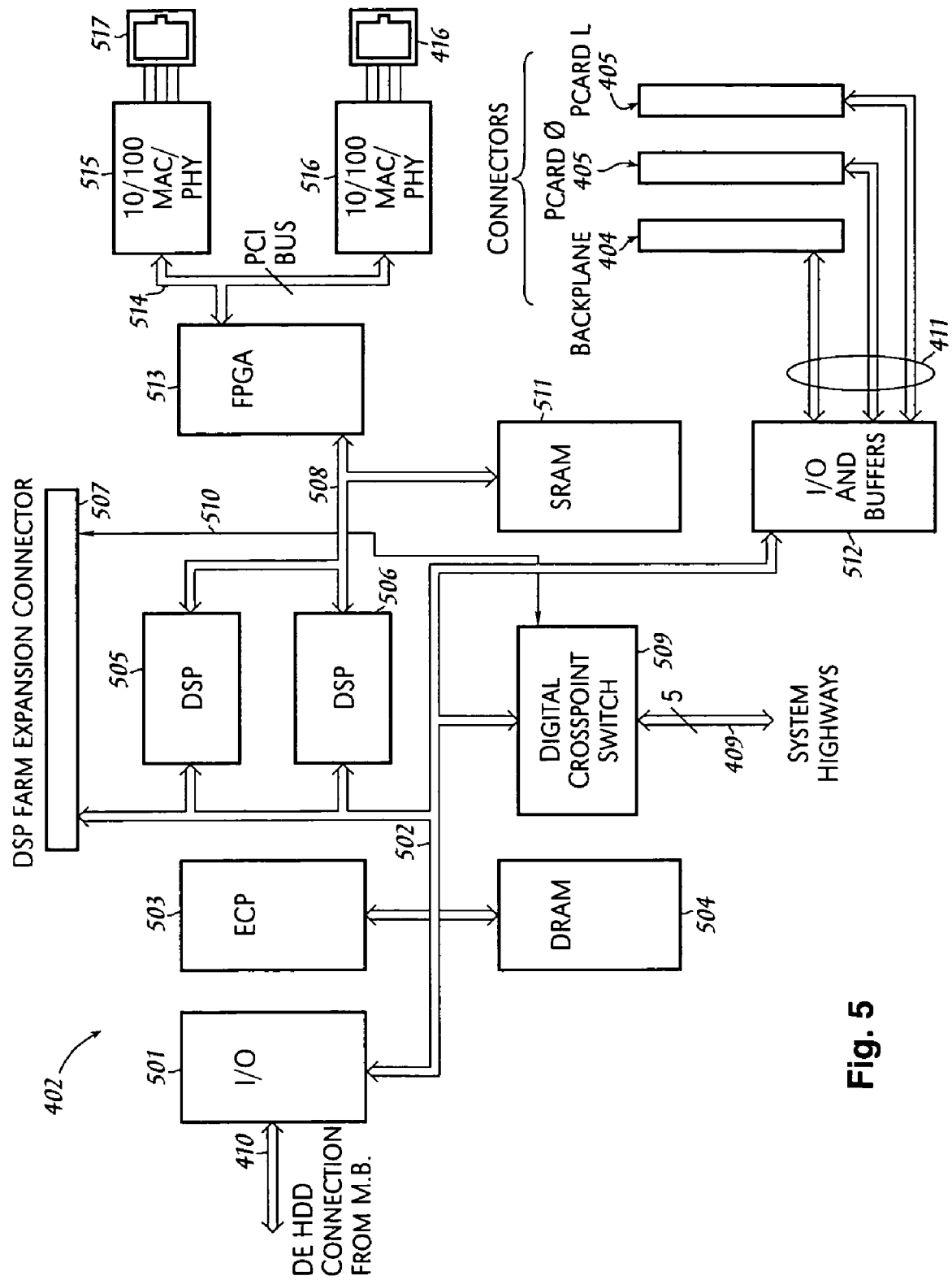
FIG. 5 illustrates a block diagram of a network card configured in accordance with the present invention.

Referring next to FIG. 5, there is illustrated a block diagram of network card 402. Network card 402 is responsible for communicating with all IP telephones, remote telephones and remote sites via a 10/100 Base T connection. The higher-level communication protocol used may be a standard UDP/IP (User Datagram Protocol/Internet Protocol) protocol. In addition, network card 402 communicates with the main board 401 for overall system control. Network card 402 has effectively replaced individual electronic key telephone circuits with a single Ethernet interface, and network card 402 now acts as the central distribution point for all peripheral cards 405, which can plug into backplane 404.

Ribbon cable 410 from hard drive 403 is received at I/O 501 coupled to bus 502. Bus 502 is coupled to ECP (Enhanced Call Processing) microcontroller 503, DRAM 504, DSPs 505 and 506, DSP farm expansion connector 507, digital cross-point switch 509, and I/O and buffers 512. ECP 503 is a microcontroller responsible for overall communications between network card 402 and main board 401. ECP 503 directly interfaces the DSPs 505, 506 via the host port interface. The host port interface is a parallel (8 bit) interface between the DSPs and the host processor. This interface can be used to directly manipulate the DSP memory by a host processor. I/O 501 is a mailbox type parallel communication channel, which is multiplexed between communication with the IDE disk drive 403 and I/O 501 allowing direct control for functions such as firmware download and message passing. ECP 503 is based on a 16-bit Hitachi H8 family processor with built-in flash memory.

DSPs 505 and 506 can be implemented using Texas Instrument 5410 DSPs that perform packet encoding/decoding, jitter buffer management and UDP/IP protocol stacked functions. DSPs 505, 506 are connected to an external SRAM 511 and ASIC (FPGA) 513 that performs a PCI bridge function between bus 508 and bus 514, which is coupled to connectors 517 and 416 via 10/100 MAC/PHY devices 515 and 516. DSPs 505, 506 communicate with peripherals 405 via bus 502. DSP firmware is downloaded via the host port interface 501. I/O 501 allows communication with the main board 401 and the hard drive 403. Additionally, EPC 503 can directly control a daughter card containing additional DSPs through expansion connector 507 for functions such as speech compression.

Digital cross-point switch 509 is used to connect system voice conversations as needed between peripherals. Main board 401 houses the master cross-points with 616 discussed below with respect to FIG. 6. The peripheral cards 405 share a pool of 160 time slots. Cross-point switch 509 is primarily responsible for connecting the packet-switched voice connections of the IP telephones or remote systems to the circuit switchboard. The FPGA/PCI bridge 513 performs the functions required to connect the 10/100 Base T Ethernet MAC/PHY devices 515, 516. Since devices 515, 516 are designed to communicate via a standard PCI bus 514, the FPGA 513 implements a minimal PCI bus implementation. In addition, the FPGA 513 implements 1/0 latches and buffers as required.

The 10/100 Base T devices 515, 516 are stand-alone Ethernet devices, which perform the media access control ("MAC") and the PHYsical layer functions in a single, low-cost chip. Devices 515, 516 communicate to the host processor via a standard PCI bus 514, and communicate to the network via a pulse transformer coupled RJ-45 connection 517, 416. These devices contain FIFOs to minimize lost packets during traffic peaks. Per the PCI bus mastering specification, devices 515, 516 take control of the DSP bus and DMA data directly to SRAM 511. Conversely; the DSP 505, 506 writes data to be sent into the SRAM 511 and the devices 515, 516 DMA data via the PCI bus 514 to the network (LAN).

Figure 6:
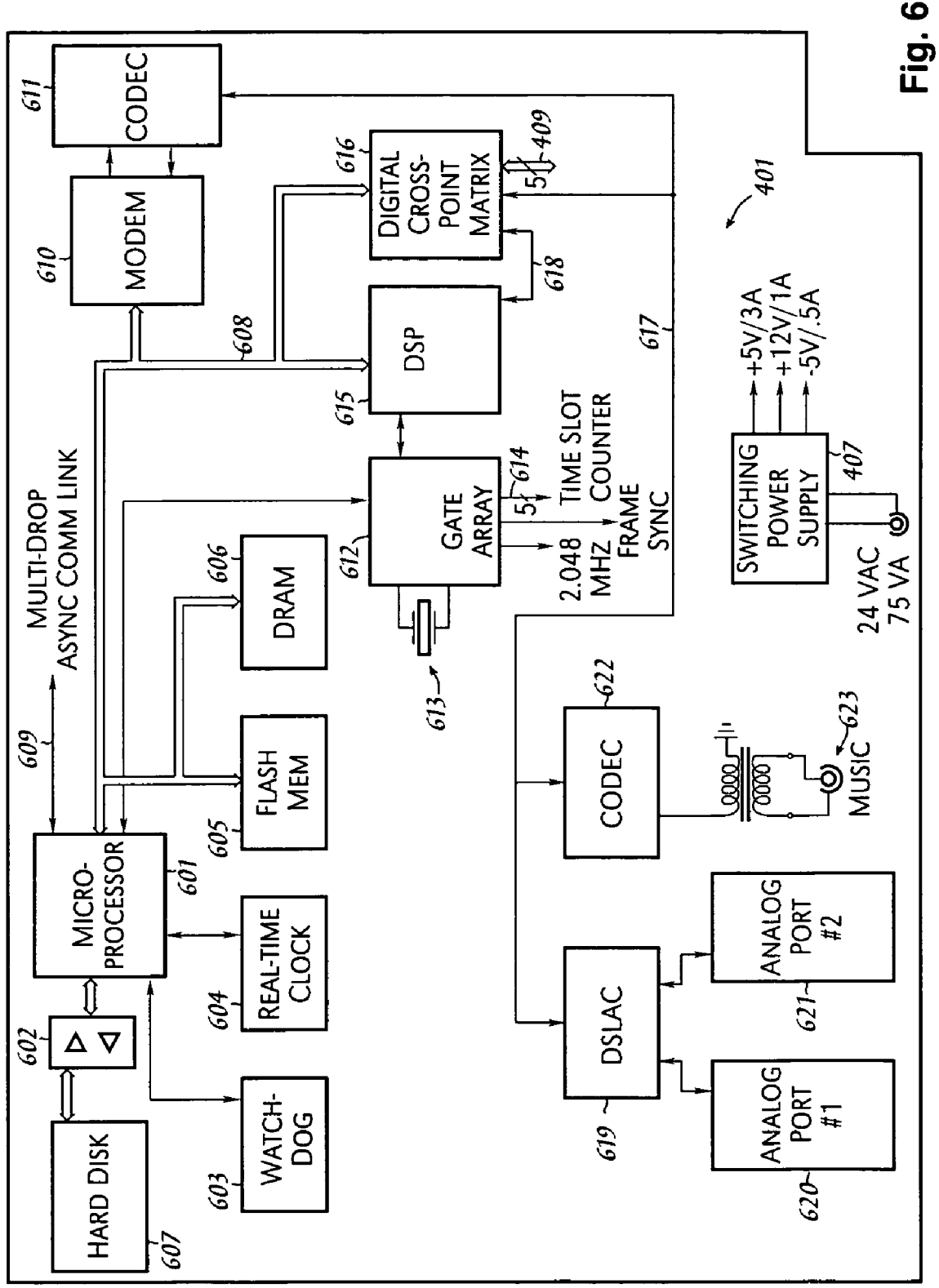
FIG. 6 illustrates a block diagram of the main board of the present invention.

Referring next to FIG. 6, there is illustrated, in block diagram form, main board 401 for integrating call processing and voice processing using a single processing means, which in this example is one microprocessor 601. Microprocessor 601, which may be a Motorola 68000 class microprocessor, communicates with hard disk 607 using driver circuitry 602. Hard disk 607 stores program data, voice prompts, voice mail messages, and all other types of speech used within main board 401.

Microprocessor 601 also includes watchdog timer 603 and real-time clock source 604.

Microprocessor 601 is coupled via bus 608 to flash memory 605 and dynamic random access memory ("DRAM") 606. Flash memory 605 is used to store bootstrap data for use during power up of main board 401. DRAM 606 stores the program accessed by microprocessor 601 during operation of main board 401.

Bus 608 also couples microprocessor 601 to signal processing circuitry, which in this example is digital signal processor ("DSP") 615. Digital signal processor 615 implements a number of functions traditionally implemented by discrete analog components.

Figure 13:
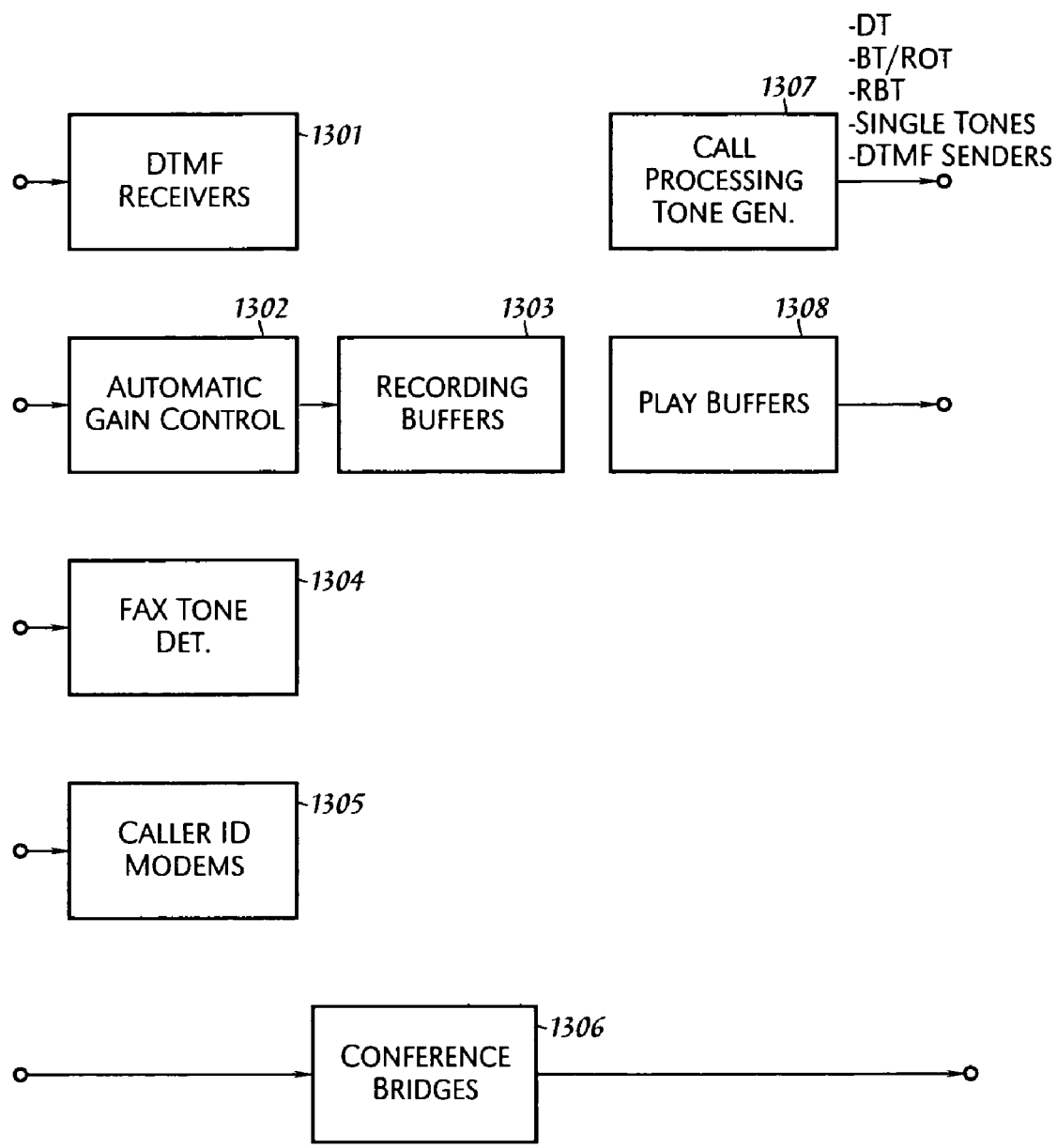
FIG. 13 illustrates functions implemented in the processing means of the main board.

Referring next to FIG. 13, there are illustrated some of the primary functions implemented in DSP 615. DTMF receivers 1301 are implemented using frequency domain filtering techniques. DTMF receivers 1301 detect all 16 standard DTMF (touch-tone) digits.

Automatic gain control ("AGC") 1302 is a closed-loop gain control system which normalizes received audio levels during recording.

Recording buffers 1303, which are coupled to AGC 1302, receive and store speech samples after they have passed through AGC block 1302. These speech samples are converted to L-law PCM (Pulse Code Modulation) and double buffered (several samples per buffer). Microprocessor 601 copies the record data out of DSP buffers 1303 into RAM buffers (not shown), which are located in the microprocessor 601 data RAM area.

Fax tone detector 1304 is implemented using frequency domain filtering techniques. Fax tone detector 1304 detects the standard 1100 Hz FAX CNG tone (also referred to as the Calling Tone).

Caller ID modems 1305 are 1200 baud FSK modems similar to Bell 202-type modems. Caller ID modems 1305 are implemented as a frequency discriminator where a time delayed (quadrature) signal is multiplied by the original signal, low pass filtered, then sliced, which produce the square wave caller ID data stream.

Call processing tone generators 1307 are free running oscillators which generate the appropriate tones (and tone pairs) which make up the industry standard call processing tones. These tones include:

dial tone
busy/reorder tone
ring back tone
single frequency (440 Hz) tone
DTMF dialer tones Play buffers 1308 replay data from hard disk 607 through microprocessor 601 and place this play data in buffers 1308. This data is converted from an 8-bit μ-law PCM signal to 14-bit linear data.

Conference bridges 1306 allow multiple conference bridges to mix together conferees into a multi-party conference. These conferees may be a mixture of inside and outside parties. A combination of "loudest speaker" and "summing" is utilized.

DSP 615 communicates with microprocessor 601 via a host interface port ("HIP") via bus 608. The HIP link supports a command-based protocol, which is used to directly read or write DSP memory locations. DSP 615 is a RAM-based part and has its program downloaded from microprocessor 601. Once downloaded and running, microprocessor 601 (the host) polls for events or receives interrupts indicating that data is available. DSP 615 speech connections are made over an industry standard 32-time slot, 2.048 megabits per second (Mb/s) digital serial link 618. Link 618 occupies one of the digital highways implemented by digital cross-point matrix 616. Each service of DSP 615 occupies a single time slot. For example, DTMF receiver 1 occupies time slot 0 while conference bridge circuit 12 occupies time slot 31.

Digital cross-point matrix 616 is also coupled to bus 608 and operates to connect any voice path to any other voice path. Digital cross-point matrix 616 is a VLSI (Very Large Scale Integration) integrated circuit. An example of digital cross-point matrix 616 is manufactured by MITEL Semiconductor Corporation as part No. 8980. Digital cross-point matrix 616 communicates with microprocessor 601 via a memory mapped input/output (I/O) scheme. A command/control protocol is used for communication between microprocessor 601 and digital cross-point matrix 616 via bus 608. Cross-point matrix 616 is coupled by highway 618 to DSP 615. Cross-point matrix 616 is coupled to highway 617.

Digital cross-point matrix 616 is capable of making 256 simultaneous fully non-blocking connections. However, it may be upgraded by adding additional DSPs and/or cross-point matrices.

Gate array 612 is an SRAM (Static Random Access Memory) based device. An example of gate array 612 is manufactured by XILINX. Gate array 612 is responsible for generating all system timing. A master clock signal is provided by microprocessor 601 at 16.384 MHz. This clock signal is divided down to provide a number of phase coherent system clocks such as 4.096 MHz, 2.048 MHz and 8 KHz (frame sync). In addition, a 5-bit time slot counter is implemented which allows all the system CODECs to detect the appropriate time slot to use (0–31). An additional divider chain is included to divide the system clock down to 20 Hz, which is used by the ringing generator power supply (not shown).

Gate array 612 is downloaded at boot-up by system software. Gate array 612 is based on an SRAM architecture. That is, the internal fusible links commonly found in programmable logic are actually stored in volatile SRAM. Because of this architecture, gate array 612 is downloaded after power-up. Also, note the added flexibility of being able to modify the logic by simply loading new system software. Because the device is SRAM-based, it loses its programming when power is removed.

Bus 608 is also coupled to modem 610, which provides a capability of calling into system 401 on a remote basis to load additional programs, voice prompts, etc., or updates thereto, into hard disk 607. Modem 610 is coupled to coder/decoder ("CODEC") 611, which is coupled to highway 617. This connection allows coupling of modem 610 through cross-point matrix 616 to CO lines through bus 409 to the p-cards described with respect to FIG. 5.

Also coupled to highway 617 is dual subscriber line access chip (DSLAC) 619, which is well-known in the art, and which is coupled to analog ports 620 and 621, which provide an ability for system 401 to communicate to analog-type connections such as cordless telephones and fax machines.

Highway 617 is also coupled to CODEC 622, which is coupled to transformer 623 to a music source, which provides an ability to couple an external music source to a caller through cross-point matrix 616 for such things as providing the caller with music on hold.

Power to system 401 is provided through switching power supply 407, which converts AC to the various DC supply voltages needed by circuitry within system 401.

Figure 7:
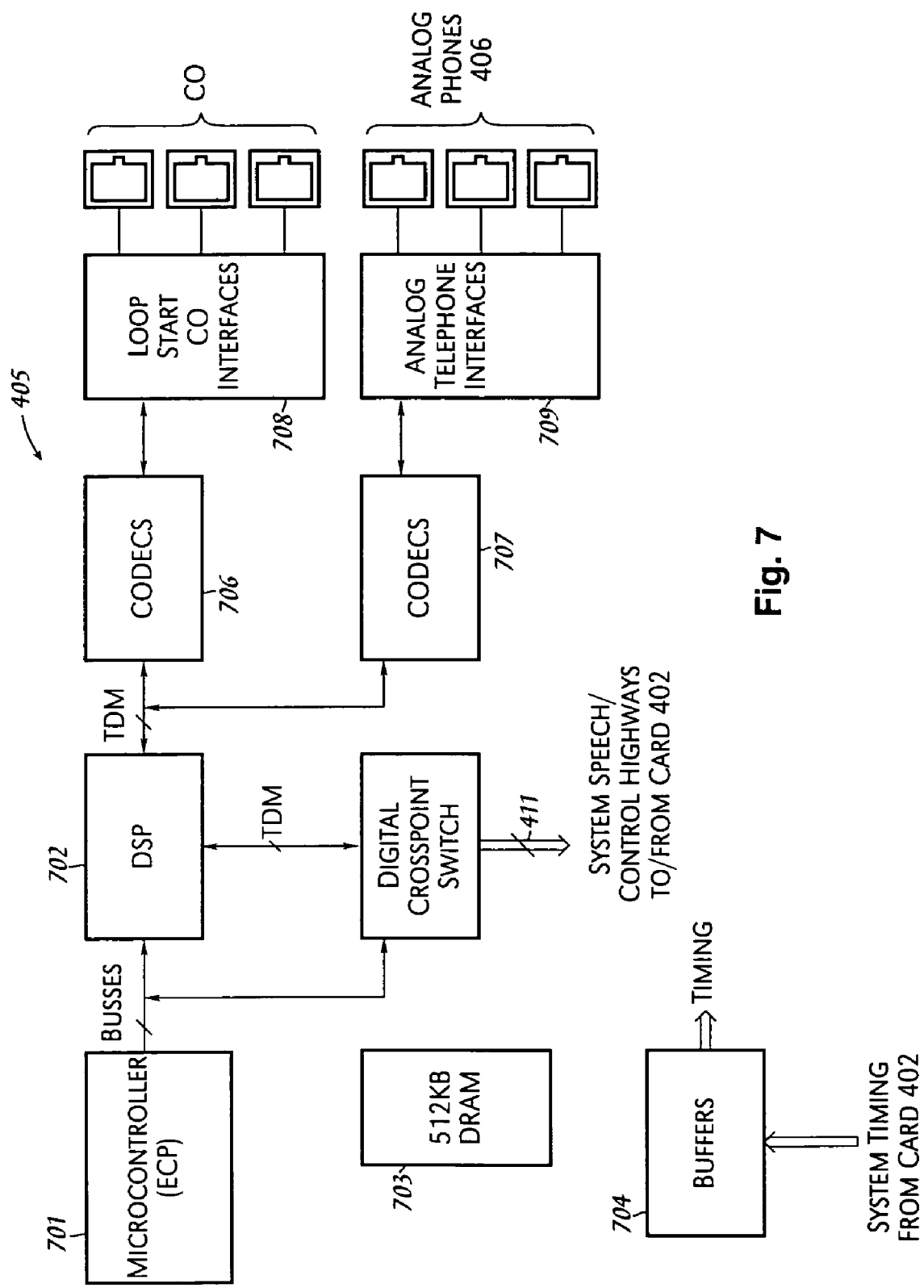
FIG. 7 illustrates a block diagram of a peripheral card configured in accordance with the present invention.

Referring next to FIG. 7, there is illustrated peripheral-card ("p-card") 405, which is coupled to main board 401. Main board 401 communicates with p-card 405 via system speech/control highways 411. This connection 411 is made to microcontroller 701 via digital crosspoint switch 705. P-card 405 provides interconnections between CO lines and analog phone lines to network card 402.

Microcontroller 701 controls all the real-time functions associated with p-card 405. When p-card 405 is plugged into backplane 404, a card address is assigned to p-card 405. This card address is read by microcontroller 701 and is used to filter commands over communication link 411. When network card software wants to communicate with the specific p-card 405, the address is sent in the message packet which all p-cards 405 receive. P-cards 405 match the address in the message to the hard-wired address on the ribbon cable 411. If a match is made, only that p-card 405 responds to the command set.

Microcontroller 701 contains an internal program memory (not shown) and is connected to an external DRAM 703. The internal program memory contains a bootstrap program which upon reset or power-up, requests a fresh firmware load from network card 402. This firmware load is transferred to DRAM 703. Upon download completion, the program is run from within DRAM 703. This scheme allows for microcontroller 701 firmware to be updated and loaded at any time.

Network card 402 sources all system timing through buffers 704. Timing signals to p-card 405 consists of a 2.048 MHz clock signal, an 8 KHz frame sync, which signifies the first time slot of a 32 time slot highway, and 5 time slot counter bits, which represent a binary count from 0 to 31.

As mentioned above, p-card 405 is assigned a card slot address when it is connected to network card 402. This card slot address is used to calculate which time slots p-card 405 should be using. The time slots used for the CO codecs 706 and analog phone codecs 707 are generated by buffers 704.

The loop start central office (CO) lines are supplied by the local telephone company and consist of a wet balanced differential audio pair. The term "wet" refers to the fact that a voltage of −48 volts is present on the pair. The system requests dial tone from the CO by providing a nominal 200 ohm loop across the TIP and RING conductors and releases the connection by opening the loop. The CO rings the system by placing a 90 vrms AC, 20 Hz sine wave on the TIP and RING conductors. The system seizes the line by going off hook.

Interfaces 708 incorporate a circuit that monitors the voltage present across TIP and RING of each CO. This line voltage monitor circuit serves to detect the ring voltage present during ringing (ring detection) and the unique feature of monitoring the CO line status for conditions such as whether the CO is plugged in or if someone is off hook in front of the system. The latter can be used to detect theft of service or allow a credit card verification terminal to be used without interfering with normal system operation.

The voltage monitor circuit consists of a balanced differential op-amp connected across TIP and RING of the CO lines through a very high impedance (>10M ohms). The output of the four voltage monitor op-amps are fed to an analog-to-digital converter with a built-in analog multiplexer (not shown). Microcontroller 701 firmware monitors the line voltages.

There is also a balanced differential AC coupled op amp across the CO TIP and RING to monitor the low level audio tones present during caller ID. The output of these op-amps are selected via an analog switch during the idle period and are connected to the CO line codec 706.

To correctly terminate the CO line (seizure) care must be taken to satisfy the DC loop requirements (~200 ohms) and the AC impedance requirements (~600 ohms). The classic approach has been to terminate TIP and RING with an inductor (called a holding coil) which has a large inductance (>1 Hy) and a DC resistance of ~200 ohms. The inductor separates the AC and DC components to give the desired effect. The problem is that the inductor must be large enough not to saturate with currents as high as 100 milliamps. An inductor which satisfies these requirements is physically cumbersome.

P-card 405 incorporates a solid state inductor circuit called a gyrator (not shown) to implement the holding coil function. This single transistor emulates an inductor with the above requirements while taking up very little PCB space.

A small solid state relay (not shown) is used as the hook switch. When energized, the gyrator holding coil is placed across TIP and RING closing the loop. The audio present on TIP and RING is AC coupled to a small dry transformer. The secondary of this transformer is connected to the AC termination impedance and to the codec 708, which may be implemented on a dual subscriber line access chip ("DSLAC").

High voltage protection is provided for all paths on the TIP and RING connections. These paths include TIP to RING, TIP to GROUND, RING to GROUND, and TIP and RING to GROUND. This high voltage protection is accomplished by first passing the TIP and RING conductors through positive temperature coefficient varistors (not shown). These varistors act as resettable fuses. When excessive current flows through these varistors, they become resistive thus limiting the current flow. When the excessive current is stopped, the original resistance is restored.

Figure 8:
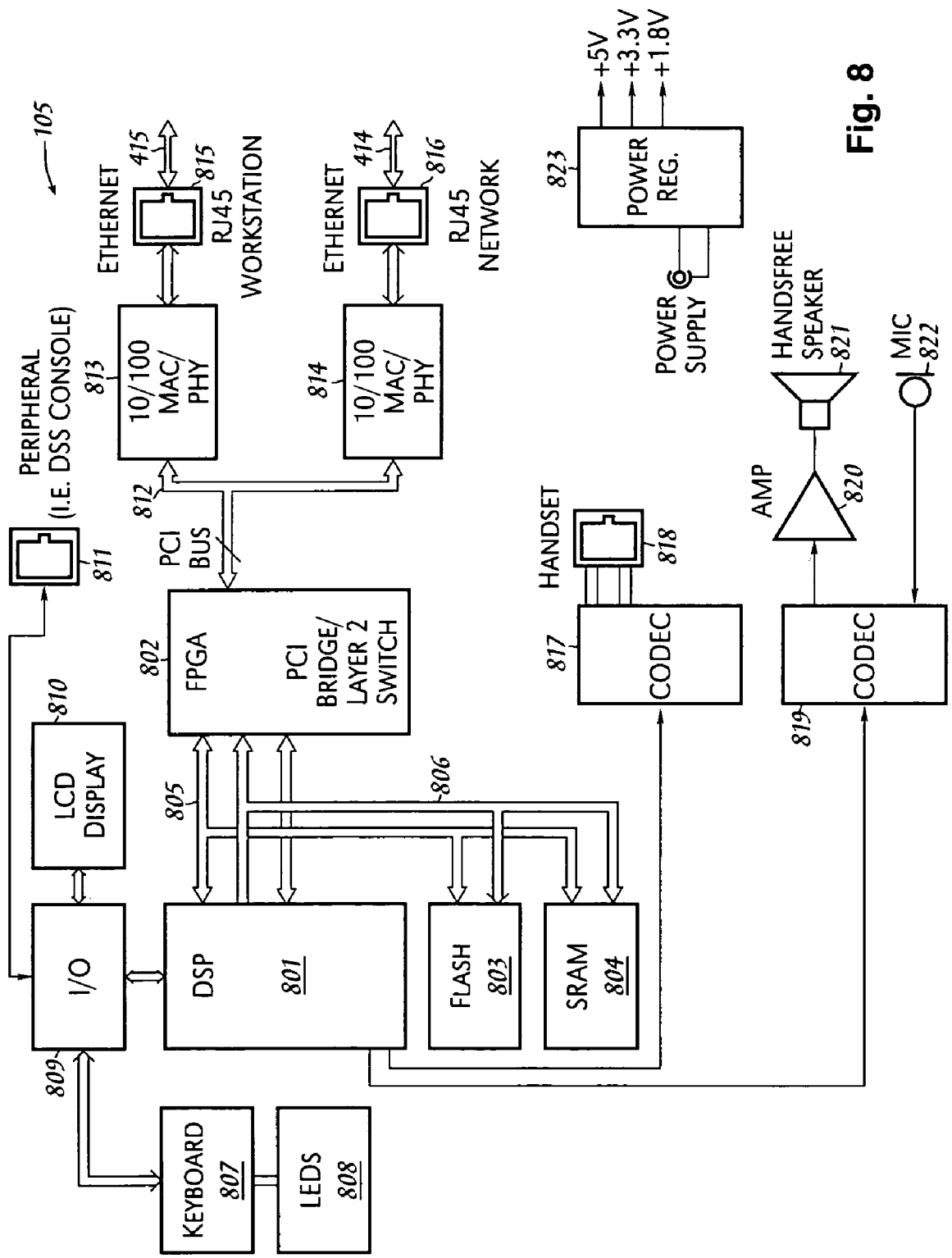
FIG. 8 illustrates a block diagram of a telephony device configured in accordance with the present invention.

Referring to FIG. 8, there is illustrated a block diagram of further detail of IP telephony device 105. IP telephony device 105 may be a DSP based telephone instrument. Telephony device 105 communicates with the multimedia server 101 via the UDP/IP Protocol. PHYsical connection to the LAN is via an Ethernet 10/100 Base T interface. IP telephony device 105 contains the ability to perform layer-2 switching between two Ethernet ports in the telephony device for total control over voice versus data quality of service in accordance with the present invention. Speech samples are digitized, stored in 16 millisecond long packets and transmitted to the multimedia server 101 via the UDP/IP Protocol. As packets are received, they are triple-buffered to compensate for jitter before playback.

Connection 415 from workstation 106 is received by Ethernet RJ-45 connector 815, which is coupled to MAC/PHY device 813. Connection 414 between hub 103 and telephony device 105 is connected to RJ-45 connector 816 which is coupled to MAC/PHY device 814. Devices 813 and 814 are coupled by PCI bus 812 to FPGA/PCI bridge 802.

DSP 801 may be a Texas Instruments Model 5402 DSP; DSP 801 can be the only processor implemented within telephony device 105. DSP 801 performs typical DSP audio algorithms such as tone generation, gain, speaker phone algorithms, and energy detection. In addition, DSP 801 acts as a standard control processor performing such tasks as scanning the keyboard 807, lighting LED lamps 808, displaying LCD messages on LCD 810, performing UDP/IP stack functions, and communicating with devices 813, 814 via the PCI bus 812. Note that DSP 801 communicates with keyboard 807, LEDs 808, LCD display 810, and peripheral connection 811 by I/O device 809 in a typical manner. Peripheral connection 811 permits a coupling of DSP 801 to a DSS console. A DSS console is a stand-alone device, which connects to the IP telephony device 105 to provide 64 individual LED lamps and keys. The lamps can be programmed by the user to monitor the status of individual stations, trunks or features. Pressing the key will access the associated function. Each telephony device in the system can connect to a DSS console. The DSS console communicates with the IP telephony device 105 via a 9600 baud serial communication link. The IP telephony device 105 does not contain a serial UART device, so the serial data protocol is controlled by software running in DSP 801.

Physical connection between the telephony device and DSS console may be via a standard two pair modular line cord.

DSP 801 is coupled to an external FLASH memory 803 and a fast SRAM 804, and FPGA 802 via buses 805 and 806.

CODEC 817 and CODEC 819 perform analog to digital and digital to analog conversion of speech signals. CODEC 817 is connected to the handsets, speaker and microphone elements (not shown) via connector 818, while CODEC 819 is connected to the hands-free speaker 821 through amplifier 820, and to the hands-free microphone 822. Separating the functionality in this way permits the IP telephony device 105 to send tones or voice to one speaker while allowing a normal conversation over the other.

FPGA/PCI bridge 802 performs the functions required to connect telephone 105 to the 10/100 Base T Ethernet devices 813, 814. Since devices 813, 814 are designed to communicate via a standard PCI bus 812, the FPGA 802 implements a minimal PCI bus implementation. In addition, the FPGA 802 implements I/O latches and buffers as required.

Devices 813, 814 perform the Media Access Control and the PHYsical layer functions. Devices 813, 814 communicate to DSP 801 via a standard PCI bus 812, and communicate to the LAN via post-transformer coupled RJ-45 connections 815, 816. Devices 813, 814 can contain FIFOs to minimize lost packets during traffic peaks. Per the PCI bus mastering specification, devices 813, 814 take control of the buses 805, 806 and direct memory access (DMA) data directly to SRAM 804. Conversely, DSP 801 writes data to be sent into the SRAM 804 and the devices 813, 814 DMA the data via the PCI bus 812 to the LAN.

Figure 9:
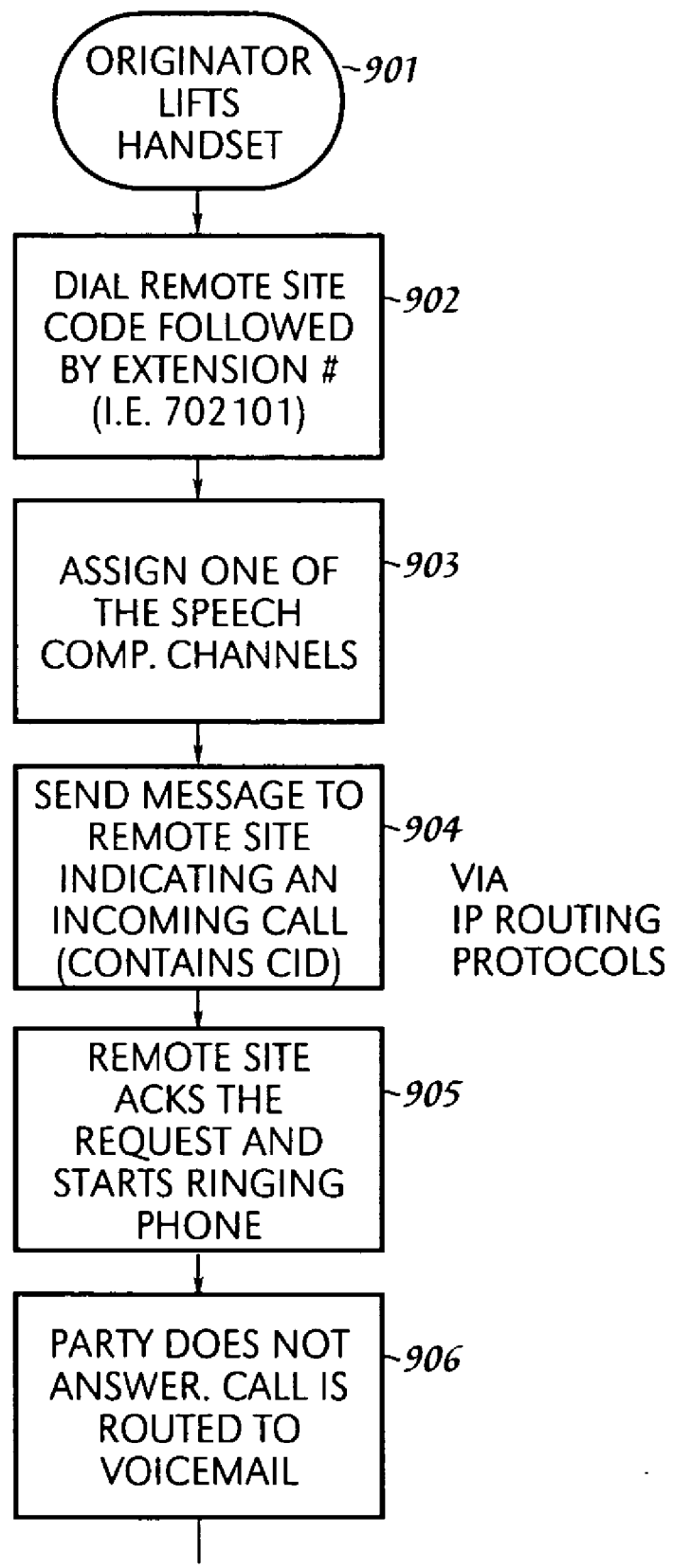
FIG. 9 illustrates a flow diagram of a station-to-station telephone call.

Referring to FIG. 9, there is illustrated a station-to-station call to a remote cite. In step 901, a user 105 in Dallas 301 lifts the handset to place an intercom call to user 308 in Detroit 302. In step 902, user 105 dials an access code associated with site 302. These codes are currently three digits long and are in the range 700–799. User 105 then dials the extension number of user 308. In step 903, the IP series multimedia server 101 assigns one of the pooled, compressed voice channels used for voice communication between sites. In step 904, the IP series multimedia server 101 then checks a configuration database for the IP address associated with user 308. A control message is sent to multimedia server 306 via the TCP/IP space WAN 201, requesting the called party 308 to start ringing. Data contained in the control message includes the originator's caller ID. In step 905, the remote multimedia server 306 acknowledges the request and attempts to ring the called extension 308 in the same fashion that a local extension would (i.e., the remote station is now acting as though it was placing the call from the local site). In step 906, if the called party 308 does not answer, the call is handled by the normal call processing routines to re-route the call (in this case, the call is rerouted to voice mail).

Figure 11:
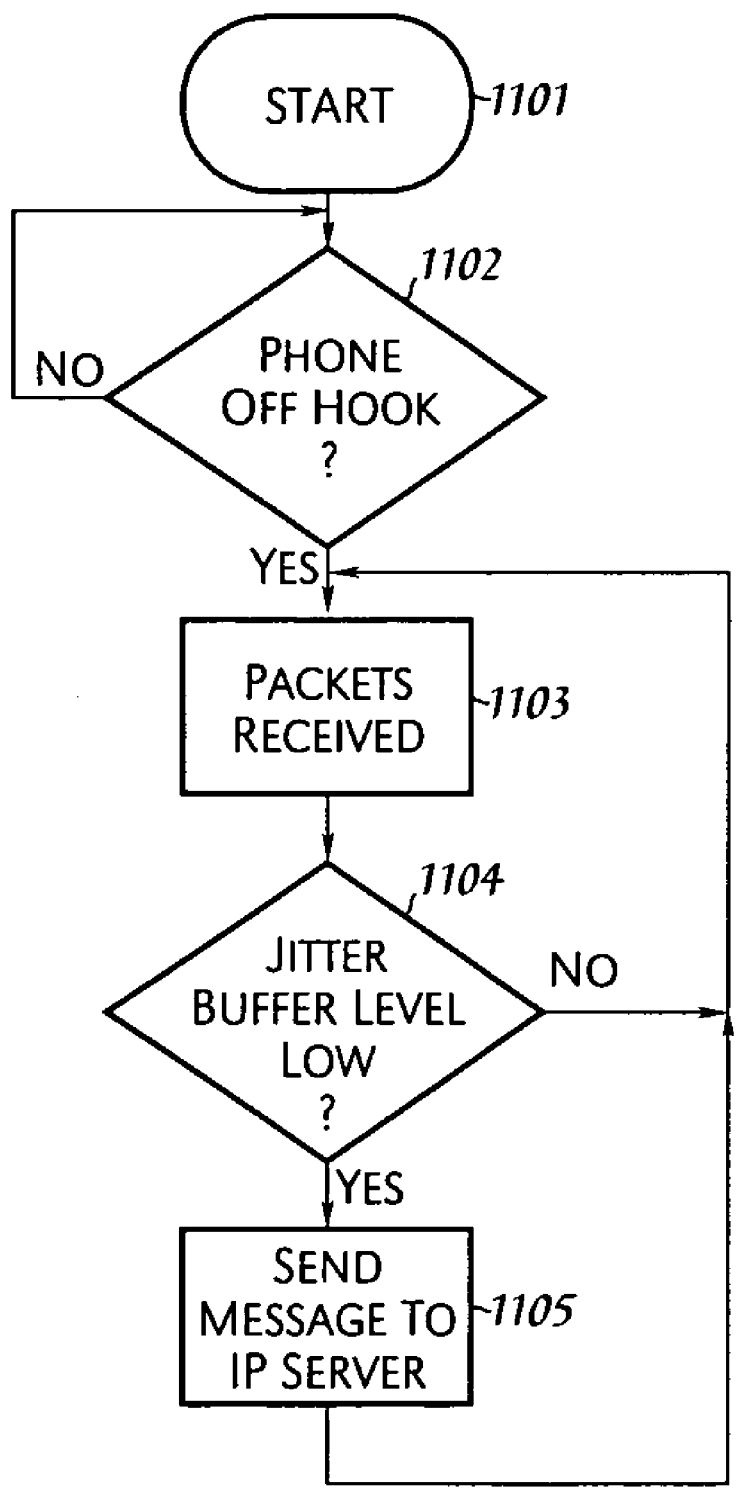

Referring to FIG. 11, there is illustrated a process implemented within an IP telephony device, such as telephony device 105, which process can be run within DSP 801. The process detects network congestion and notifies the multimedia server 101 via a congestion message. The process begins in step 1101, and proceeds to step 1102 to determine whether the IP telephony device 105 is off the hook. If it is, the process proceeds to step 1103 where audio data packets are received by telephony device 105 from the hub 103. The audio (voice) data packets being received from hub 103 have been sent by multimedia server 101, and are packets containing audio information communicated between telephony device 105 and some other telecommunications device coupled to the system. As these packets are received, they are saved within the jitter buffer, which fills up to a certain level. After this level is reached, the audio packets will then be played by telephony device 105 to the user through the speaker 821 or handset 818. It is generally understood within the design of such IP telephony devices that when a packet is played to the user, it is replaced in the jitter buffer by an incoming packet. There is some cushion in the jitter buffer, but when the audio packets are not replaced sufficiently, then the ability of the IP telephony device to communicate the audio information to the user in real-time becomes jeopardized. This is described in further detail below. In step 1104, as these packets are run through a jitter buffer, a determination is made whether the number of packets buffered by the jitter buffer falls below a predetermined threshold, or level. If not, the process merely returns to step 1103. However, if level of packets buffered by the jitter buffer falls below the predetermined threshold, or level, in step 1104, the process will proceed to step 1105 to send a congestion message to multimedia server 101.

Note, the process of FIG. 11 is not limited to audio data, but can be utilized in any system where there is a need to increase the transfer rate of multimedia data between two network devices to overcome bursty transmissions of data in the network. Though the invention is helpful when there is a need to transmit the multimedia data in, or substantially in, real-time, the invention is applicable even when there is not a need for real-time transmissions.

Essentially, a data packet transmitting voice data contains 16 milliseconds (ms) of voice data. For there to be a real-time transmittal of voice communications no more than 16 ms can pass between received data packets. A jitter buffer is utilized to temporarily store received data packets. A jitter buffer generally will hold three data packets passing through the jitter buffer. Typically, up to a 48 ms delay is acceptable with audio communications before such a delay is discernable to the listener. The jitter buffer can be used to monitor whether the congestion on the network has increased to such an extent that unacceptable delays in the receipt of voice data packets is perceived. A jitter buffer will typically use a pointer that points to the buffer entry where the next data packet that is received is to be stored, while an out pointer points to the last jitter buffer. If the pointers become closer, this will indicate that congestion within the network is increasing. How close the pointers are can determine the predetermined threshold that is monitored in step 1104.

Figure 12A:
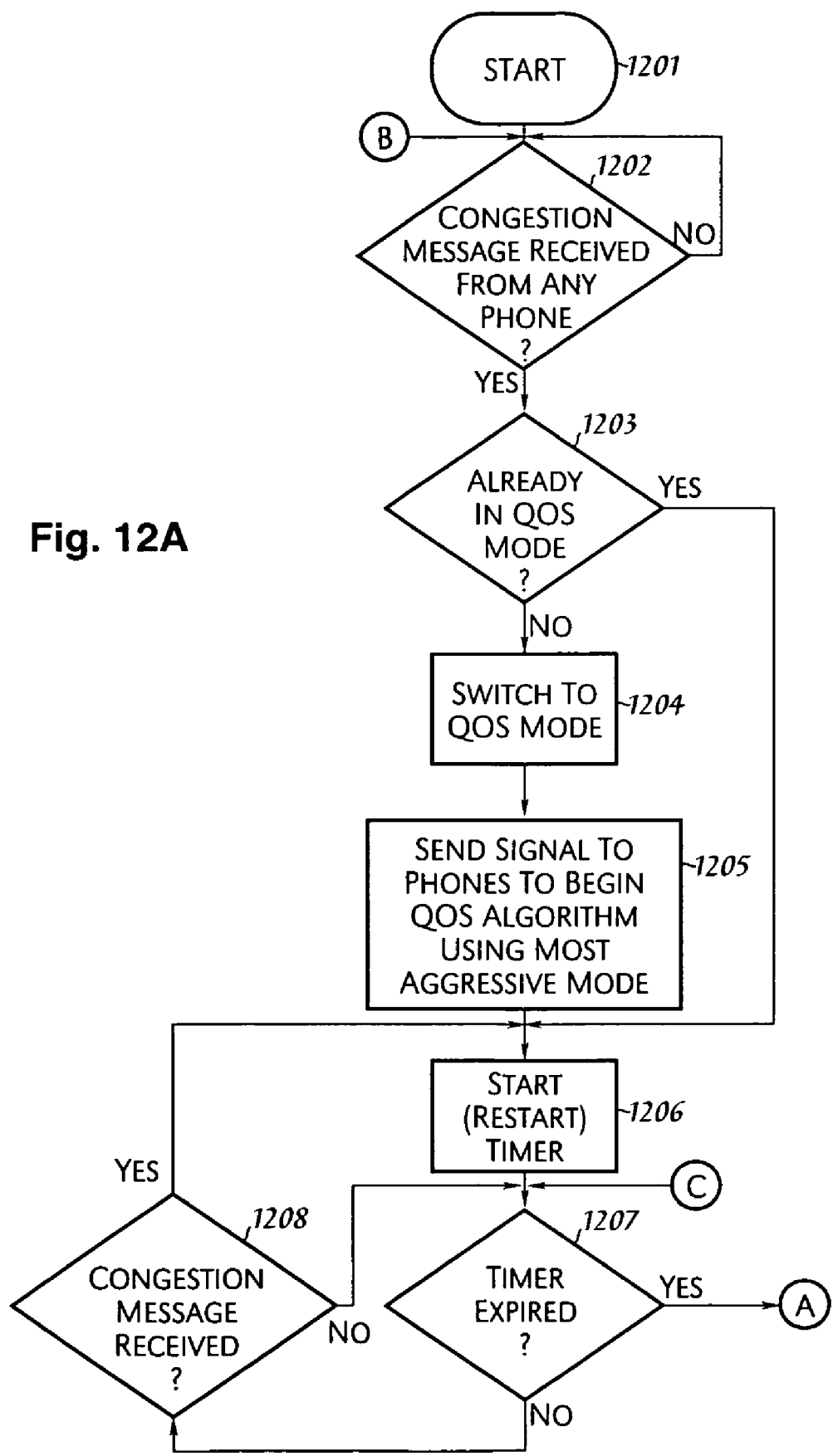
Figure 12B:
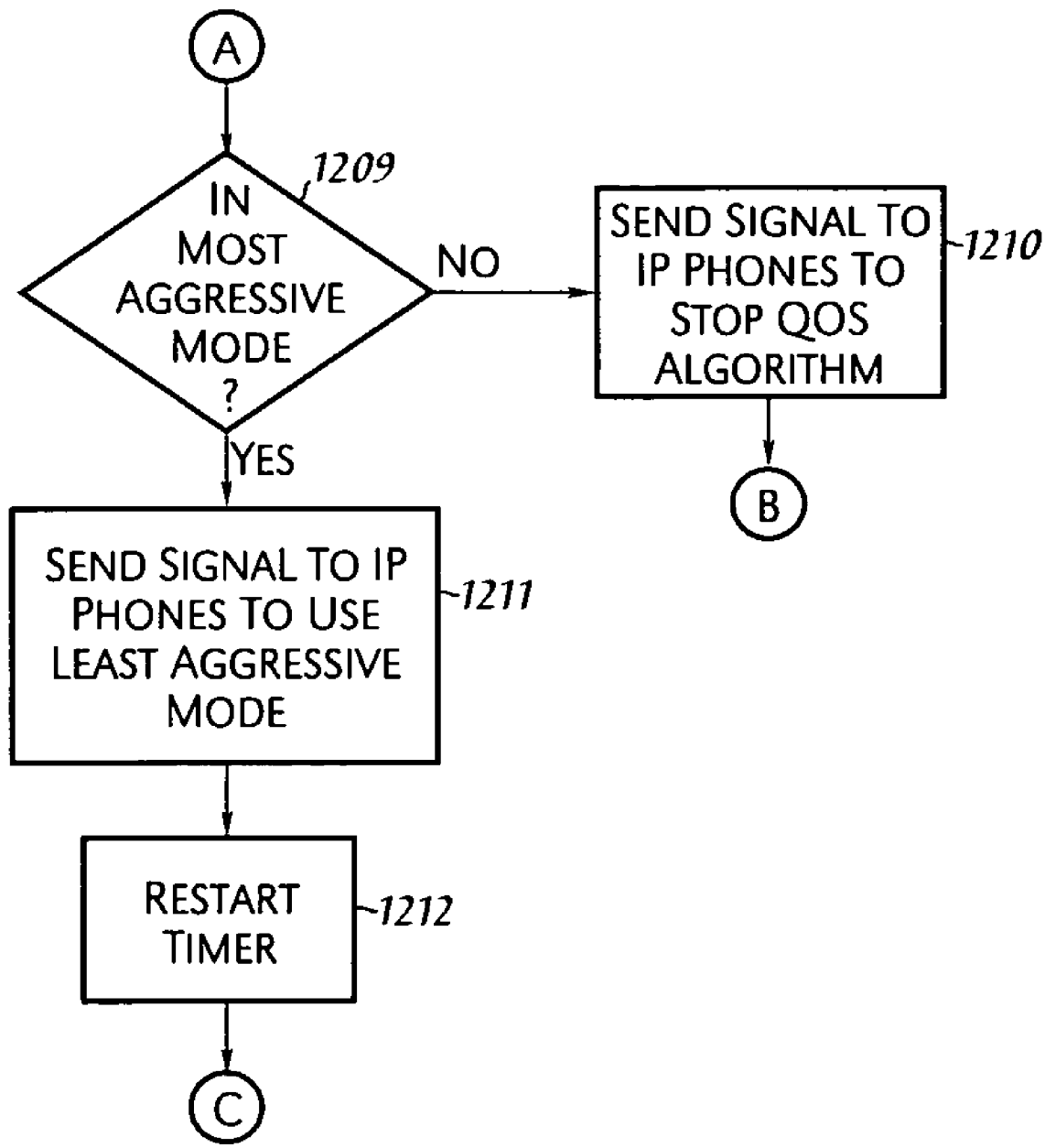

Referring next to FIGS. 12A and 12B, a flow diagram is illustrated that is implemented within multimedia server 101 upon receipt of a congestion message from any IP telephony device within the network. The process begins in step 1201, and proceeds to step 1202 to determine whether a congestion message has been received from any telephony device. If yes, the process proceeds to step 1203 to determine whether the multimedia server 101 is already in a quality of service (QOS) mode. If yes, the process will move forward to step 1206. If not, the process will proceed to step 1204 to switch to QOS mode. Thereafter, in step 1205, a signal will then be sent from multimedia server 101 to all (or only a selected group of) IP telephony devices within the network for such devices to begin a QOS algorithm using a Most Aggressive Mode. Such a QOS algorithm is further described below with respect to FIG. 10. Thereafter, in step 1206, a timer is started, or restarted if the timer has previously begun and is still running. In step 1207, a determination is made whether the timer has expired. If not, the process will proceed to step 1208 to determine whether another congestion message has been received from any IP telephony device. If not, the process merely returns to step 1207. However, if another congestion message has been received from an IP telephony device, the process will return to step 1206 to restart the timer.

If in step 1207, the timer has expired, the process will proceed to step 1209, where a determination is made whether the QOS mode is in the Most Aggressive Mode. If yes, the process will proceed to step 1211 to then send a signal to all (or a selected group of) IP telephony devices on the network to use a Least Aggressive Mode, which is further described below with respect to FIG. 10. Thereafter, in step 1212, the previously noted timer will be restarted and the process will return to step 1207. If in step 1209, the QOS mode is not in the Most Aggressive Mode, then in step 1210, a signal will be sent to all IP telephony devices on the network to stop the QOS algorithm described below with respect to FIG. 10. And the process will return to step 1202.

Figure 10:
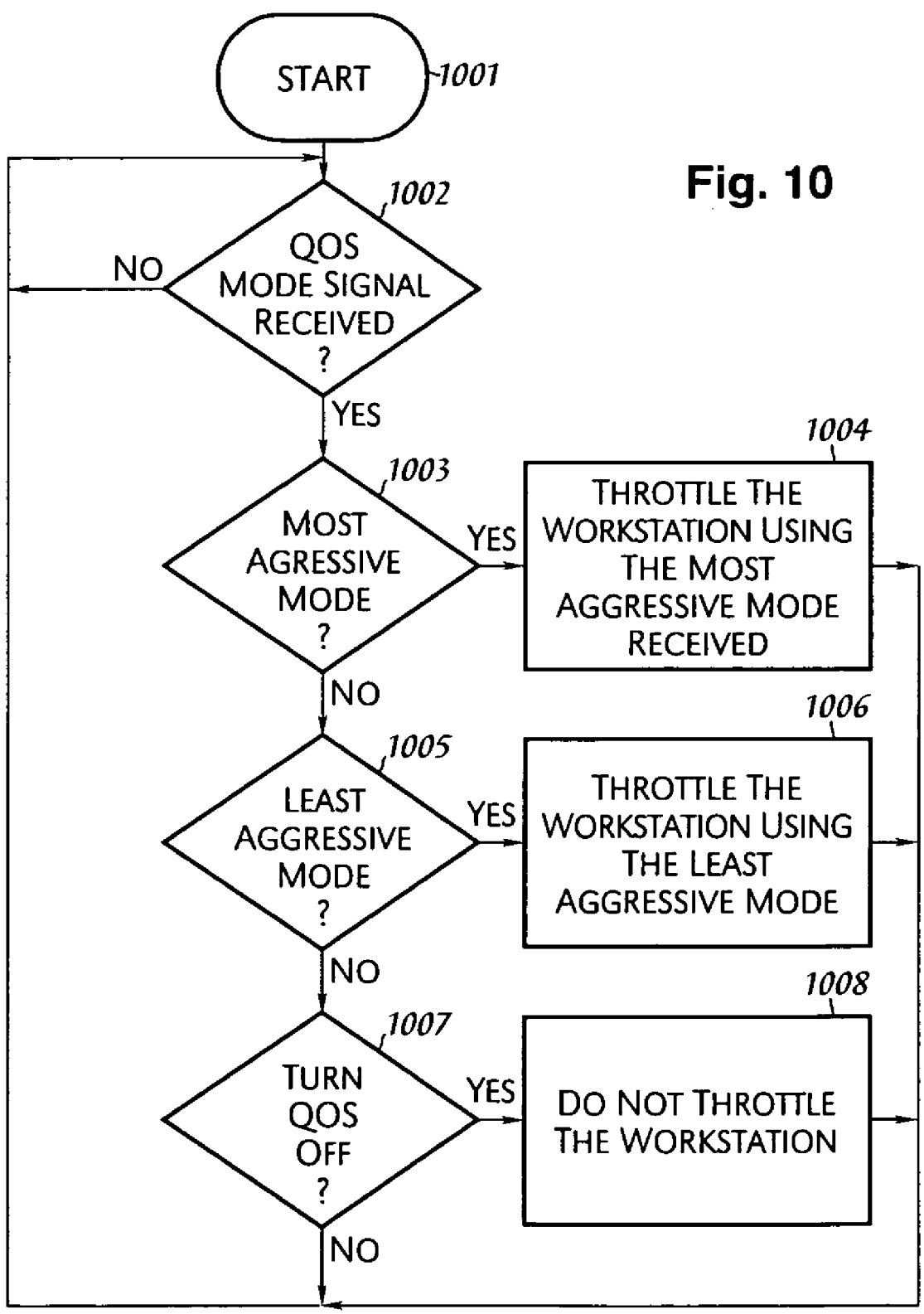
FIGS. 10, 11, 12A and 12B illustrate flow diagrams configured in accordance with the present invention.

Referring now to FIG. 10, there is illustrated a process run within each of the IP telephony devices on the network when such devices receive one of the aforementioned QOS messages from the multimedia server 101. The process begins in step 1001 and proceeds to step 1002 where a determination is made whether one of the aforementioned QOS mode signals has been received from the multimedia server 101. If yes, the process proceeds to step 1003 to determine whether the signal that has been received is a signal indicating that the IP telephony device 105 should enter into a Most Aggressive Mode. If yes, the process will then proceed to step 1004 to throttle the workstation 106 using the Most Aggressive Mode. The process then returns to step 1002. If in step 1003 it is determined that the signal received from the multimedia server 101 is not a Most Aggressive Mode signal, the process proceeds to step 1005 to determine if the signal received is a signal to the IP telephony device 105 to enter into a least aggressive mode. If yes, the process proceeds to step 1006 to throttle the workstation 106 using the Least Aggressive Mode. If in step 1005 the signal received from the multimedia server 101 is not either to enter into the Most Aggressive Mode or the Least Aggressive Mode, then a determination is made whether the signal received from the multimedia server 101 is to turn off the QOS Mode. If yes, then in step 1008, the IP telephony device 105 discontinues throttling data to and from the workstation 106.

Essentially, the process illustrated in FIG. 10 has the IP telephony device 105 beginning a hold-off procedure with the workstation 106. The level of aggressiveness, whether it is the Most Aggressive Mode or the Least Aggressive Mode can be thought of as a duty cycle whereby the device blocks data from the workstation 106 for a percentage of the time.

The throttling can be performed using many different methods. One method would be for the telephony device 105 to flood the connection 415 to the workstation 106 with idle patterns (jabber). The various levels of flow control needed could be achieved by a jabber duty cycle. The Most Aggressive Mode may have an eighty percent duty cycle while the Least Aggressive Mode may have a twenty percent duty cycle. During the jabber process, communication between the workstation 106 and the server 104 is disrupted, allowing more bandwidth for the voice packets between the telephony device 105 and the multimedia server 101.

"Jabbering" is a standard Ethernet process. In local area networking technology, to jabber is to continuously send random data (garbage). This locks up the network with the incessant transmission of the garbage. In an Ethernet network, any node can transmit at any time. If more than one node happens to transmit at the same time, both nodes will notice that a collision has occurred, hold off for some amount of time, then re-transmit. If a collision is detected again, the process continues until the data is delivered. Jabbering is the process of flooding the network with collisions in such a way that no data can actually be transmitted due to the number of collisions. Since the connection between the IP telephony device 105 and workstation 106 is a separate network, the jabbering by the IP telephony device 105 merely stops data from flowing between the IP telephony device 105 and the workstation 106. The network on the other side of the IP telephony device 105 is unaffected because it is in a different "collision domain."

The workstation 106 cannot then transmit data because the jabbering is present. Each side will try to send data to the other side, but every time they try, they will fail because of the jabbering. The source of the jabbering signal is not important. Jabbering can be explained in a hardware fashion as follows. When one and only one station is transmitting, the voltage on the wire is a certain voltage as specified by the IEEE 802.3 Specification. If two stations start to transmit, the voltage is double so any station listening is capable of detecting the collision. When the voltage goes to zero because the offenders are holding off, it is now safe to try again. Jabbering can be thought of as a station placing a static voltage level on the wire between the workstation 106 and the IP telephony device 105 sufficiently high as to be detected as a collision. Neither the IP telephone 105 or the workstation 106 will attempt to transmit to each other until this voltage level goes away.

The present invention permits the IP telephony device 105 from stopping the workstation 106 from sending data by causing so many collisions that none of the data can make it through. Essentially, data transmission between the IP telephony device 105 and the workstation 106 is frozen. The IP telephony device 105 will perform this jabbering process in bursts. When the collisions stop, the data the workstation 106 was trying to send will then be passed on to the network through the IP telephony device 105. Also, if the IP telephony device 105 was trying to send something from the network to the workstation 106, that side is frozen as well. These collision bursts are generally short enough that the protocol does not time out, but long enough to throttle the data flow. The duty cycle of the collision bursts may be proportional to the amount of data allowed to flow (i.e., if the duty cycle is 80/20, eighty percent of the time data is blocked).

A duty cycle may be used since jabbering cannot continue forever because the underlying protocols such as TCP/IP or NOVELL and the workstation 106 will eventually time out and give up on the data it is trying to send. The duty cycle allows data to flow often enough so that the effective throughput is reduced while allowing the protocols to survive. As an example, consider data flowing unobstructed between the workstation 106 and the network on the other side of the IP telephony device 105. Multimedia transmissions are initiated which, in combination with the network data, starts to choke the network. The detection mechanism (monitoring circuitry) in the IP telephony devices 105 alerts the multimedia server 101 that the network is in trouble with respect to too much congestion to permit real-time multimedia communications to occur, or merely that the transfer rate of such communications has decreased unsatisfactorily. The multimedia server 101 messages to all of the IP telephony devices that they need to throttle-down the workstation data they are receiving using the most aggressive algorithm (e.g., using an 80/20 duty cycle where eighty percent of the time the devices are in the jabber state, and twenty percent of the time they are allowing data to flow). As the IP telephony devices stop reporting congestion, the multimedia server 101 may issue the next lower level or hold-off (e.g., a 50/50 duty cycle). The multimedia server 101 will continue until a point of equilibrium exists that allows the maximum data flow in the network along with the required multimedia traffic bandwidth.

As an alternative, jitter buffers with the multimedia server 101 may also monitor their level of receipt of multimedia data from individual IP telephony devices to determine whether a congestion message should be sent to the IP telephony devices to throttle down data through such devices from their respective workstations.

The present invention incorporates many other unique features. Essentially, the present invention is able to emulate one large, monolithic phone system. As such, features available at one particular site are available remotely to all sites. For example, the present invention can implement a direct station selection with busy indication feature providing an ability for a user at one IP telephone to see that another person in a remote system at another IP telephone is currently idle, busy, or in a do not disturb state. Another feature of the present invention is an ability to park a call in one system and page a user in a remote system to pick up the parked call. The remote user answers the call in the same manner they would a local call. Another feature capable within the present invention is an ability to transfer a call to a remote site, and if the call transferred to the remote site goes unanswered, the call will be returned to the originator. The present invention also provides for call forwarding between systems. For example, if a user is going to be in a remote site for some period of time, that user can forward his/her calls to that location.

Another feature available within the present invention is call rerouting. When a call goes unanswered, the system of the present invention allows the call to be rerouted to voicemail, another extension, etc. In a remote site implementation, these destinations do not have to be in the same physical system. In other words, a call into a local system where the caller has dialed an extension associated with a remote system, the local system will automatically reroute that call to the remote system.

Another unique feature of the present invention allows a user, such as a supervisor, to monitor the audio conversations of users on the system and current display information of another station. This can be done between remote systems so that the monitoring individual does not have to be in the same system as the user who is being monitored.

Yet another unique feature of the present invention permits automatic call distribution agents to be distributed among remote systems with all the feature functionality available to a single system.

Yet another unique feature of the present invention permits a user to answer a call in a remote site using the pick up feature. The present invention allows members of departments and live ringing groups to be located anywhere in the distributed system.

The present invention also increases the voicemail functionality of a telephone system. A virtual mail box key feature allows a user to monitor the status of a mail box in a remote system. If the key is lit, the user can press the key to retrieve messages stored in that mail box. Another feature is the quick group feature that allows a user to leave voicemail messages in a number of recipients' mail boxes by merely pressing their associated DSS key. The recipients can be in remote systems as well as the local system. Like the quick groups feature, a quick move feature allows a user to move a copy of a voicemail message to a number of recipients by merely depressing their respective DSS keys on the user's telephone.

Another unique feature to the present invention permits a user to dial numbers stored in a series of lists. A user is permitted to scroll through a list of remote sites. When the user finds the desired site, the user is then presented with the same options a user local to that site would have. An example of this feature would allow a user in Los Angeles to locate the New York site, then call Bob Smith using a particular feature all without the need of an operator or printed directory.

Although the present invention and its advantages have been described in detail, it should be understood that various changes, substitutions and alterations can be made herein without departing from the spirit and scope of the invention as defined by the appended claims.

What is claimed is:

1. An information handling system comprising:
   a hub;
   a multimedia server coupled to the hub;
   a telephony device coupled to the hub; and
   a first network device coupled to the hub through the telephony device, wherein the telephony device includes circuitry for throttling data sent from the first network device, wherein the telephony device includes circuitry for monitoring an amount of data addressed to and received by the telephony device, wherein the throttling circuitry reduces a future amount of data from being transferred from the first network device if the amount of data addressed to and received by the telephony device falls below a predetermined threshold.

2. The system as recited in claim 1, wherein the monitoring circuitry comprises a jitter buffer where the predetermined threshold is a predetermined level within the jitter buffer.

3. The system as recited in claim 1, wherein the monitoring circuitry further comprises circuitry for sending a congestion message to the multimedia server when the amount of data addressed to and received by the telephony device falls below the predetermined threshold.

4. The system as recited in claim 3, wherein the multimedia server further comprises circuitry for sending a throttling signal to the telephony device in response to receipt of the congestion message from the monitoring circuitry.

5. The system as recited in claim 4, wherein the throttling circuitry in the telephony device throttles the future amount of data sent from the first network device in response to receipt of the throttling signal.

6. The system as recited in claim 5, wherein the throttling signal includes a mode level in which the throttling circuitry should operate.

7. The system as recited in claim 6, wherein the throttling circuitry adjusts its level of throttling of the data in response to the mode level included in the throttling signal.

8. The system as recited in claim 7, wherein the mode level is a most aggressive mode, wherein the throttling circuitry will throttle the future amount of data sent from the first network device at a highest level in response to the mode level being in the most aggressive mode.

9. The system as recited in claim 8, wherein the sending circuitry in the multimedia server will designate the mode level at the most aggressive mode as long as the congestion message is received from any telephony device coupled to the multimedia server within a specified time period.

10. The system as recited in claim 9, wherein the throttling signal will switch to a least aggressive mode if the congestion message is not received from any telephony device coupled to the multimedia server within the specified time period.

11. The system as recited in claim 10, wherein the throttling circuitry will throttle the future amount of data sent from the first network device at a level lower than the highest level in response to the mode level being in the least aggressive mode.

12. The system as recited in claim 11, wherein the throttling signal will contain a signal to stop the throttling of the future amount of data if the congestion message is not received from any telephony device coupled to the multimedia server within the specified time period while the mode level has been in the least aggressive mode.

13. The system as recited in claim 12, further comprising another telephony device coupled between the hub and a second network device, wherein the telephony device also includes throttling circuitry for throttling a future amount of data sent from the second network device in response to receipt of the throttling signal.

14. An information handling system comprising:
a TCP/IP network;
a hub;
a multimedia server coupled to the hub via the TCP/IP network;
a first IP telephony device coupled to the hub via the TCP/IP network;
a first network device coupled to the first IP telephony device;
a second network device coupled to the hub via the TCP/IP network, wherein data sent from the first network device is addressed for transmission to the second network device and is transmitted through the first IP telephony device to the TCP/IP network, wherein the first IP telephony device includes first circuitry for monitoring if an amount of multimedia data being addressed to the IP telephony device and received over the TCP/IP network falls below a first predetermined threshold, wherein the first IP telephony device includes first circuitry for throttling the data sent from the first network device in response to the first monitoring circuitry determining that the amount of multimedia data being received by the first IP telephony device over the TCP/IP network falls below the first predetermined threshold.

15. The system as recited in claim 14, further comprising:
a second IP telephony device coupled to the hub via the TCP/IP network; and
a third network device coupled to the second IP telephony device, wherein data sent from the third network device is addressed for transmission to the second network device and is transmitted through the second IP telephony device to the TCP/IP network,
wherein the second IP telephony device includes second circuitry for throttling the data sent from the third network device in response to the first monitoring circuitry determining that the amount of multimedia data being received by the first IP telephony device over the TCP/IP network falls below the first predetermined threshold.

16. The system as recited in claim 15, wherein the first monitoring circuitry further comprises first circuitry for sending a first congestion message to the multimedia server over the TCP/IP network when the amount of multimedia data being received by the first IP telephony device over the TCP/IP network falls below the first predetermined threshold.

17. The system as recited in claim 16, wherein the multimedia server further comprises circuitry for sending a throttling signal to the first and second IP telephony devices over the TCP/IP network in response to receipt of the first congestion message from the first monitoring circuitry.

18. The system as recited in claim 17, wherein the first throttling circuitry in the first IP telephony device throttles the data sent from the first network device in response to receipt of the throttling signal, wherein the second throttling circuitry in the second IP telephony device throttles the data sent from the third network device in response to receipt of the throttling signal.

19. The system as recited in claim 18, wherein the throttling signal includes a mode level in which the first and second throttling circuitries should operate.

20. The system as recited in claim 19, wherein the first throttling circuitry adjusts its level of throttling of the data in response to the mode level included in the throttling signal, wherein the second throttling circuitry adjusts its level of throttling of the data in response to the mode level included in the throttling signal.

21. The system as recited in claim 20, wherein the mode level is a most aggressive mode, wherein the first throttling circuitry will throttle the data sent from the first network device at a highest level in response to the mode level being in the most aggressive mode, wherein the second throttling circuitry will throttle the data sent from the third network device at a highest level in response to the mode level being in the most aggressive mode.

22. The system as recited in claim 21, wherein the second IP telephony device includes second circuitry for monitoring if a second amount of multimedia data being received by the second IP telephony device over the TCP/IP network falls below a second predetermined threshold, wherein the second monitoring circuitry further comprises second circuitry for sending a second congestion message to the multimedia server over the TCP/IP network when the second amount of multimedia data being received by the second IP telephony device over the TCP/IP network falls below the second predetermined threshold.

23. The system as recited in claim 22, wherein the sending circuitry in the multimedia server will designate the mode level at the most aggressive mode as long as the first or second congestion messages are received within a specified time period.

24. The system as recited in claim 23, wherein the throttling circuitry will throttle the data sent from the second network device at a level lower than the highest level in response to the mode level being in the least aggressive mode.

25. The system as recited in claim 24, wherein the multimedia data includes real-time audio information.

26. The system as recited in claim 22, wherein the throttling signal will switch to a least aggressive mode if the congestion message is not received from any IP telephony device coupled to the multimedia server within the specified time period.

27. The system as recited in claim 26, wherein the throttling signal will contain a signal to stop the throttling of the data if the congestion message is not received from any IP telephony device coupled to the multimedia server within the specified time period while the mode level has been in the least aggressive mode.

28. The system as recited in claim 14, wherein the data sent from the first network device is sufficiently throttled so that the first IP telephony device can communicate real-time signals to and from the multimedia server over the TCP/IP network.

29. In an information handling system comprising a hub, a multimedia server ("multimedia server") coupled to the hub, a telephone coupled to the hub, a workstation coupled to the hub through the telephone, and a data server coupled to the hub, a method comprising the steps of:
transferring data from the workstation to the telephone, wherein the data sent from the workstation is addressed for transmission to the data server;
communicating audio information between the telephone and the multimedia server; and
sufficiently throttling the data sent from the workstation to the telephone to increase a rate of transfer of the audio information during the communicating step, wherein the throttling step further comprises the step of monitoring an amount of the audio information being received by the telephone from the multimedia server.

30. The method as recited in claim 29, wherein the hub, multimedia server, data server, telephone, and workstation are coupled to each other via a network.

31. The method as recited in claim 30, wherein the network is a TCP/IP network.

32. The method as recited in claim 30, wherein the network is a packet switched network.

33. The method as recited in claim 30, wherein the telephone and multimedia server communicate using an IP protocol.

34. The method as recited in claim 29, wherein the monitoring step further comprises the step of monitoring a predetermined level within a jitter buffer.

35. The method as recited in claim 29, wherein the throttling results in no data being sent from the workstation to the telephone.

36. In an information handling system comprising a hub, a multimedia server ("multimedia server") coupled to the hub, a telephone coupled to the hub, a workstation coupled to the hub through the telephone, and a data server coupled to the hub, a method comprising the steps of:
transferring data from the workstation to the telephone, wherein the data sent from the workstation is addressed for transmission to the data server;
communicating audio information between the telephone and the multimedia server; and
sufficiently throttling the data sent from the workstation to the telephone to increase a rate of transfer of the audio information during the communicating step, wherein the throttling step further comprises the step of reducing a future amount of data from being transferred from the workstation if the amount of data exceeds a predetermined threshold.

37. In an information handling system comprising a hub, a multimedia server ("multimedia server") coupled to the hub, a telephone coupled to the hub, a workstation coupled to the hub through the telephone, and a data server coupled to the hub, a method comprising the steps of:
transferring data from the workstation to the telephone, wherein the data sent from the workstation is addressed for transmission to the data server;
communicating audio information between the telephone and the multimedia server; and
sufficiently throttling the data sent from the workstation to the telephone to increase a rate of transfer of the audio information during the communicating step, wherein the throttling step further comprises the step of monitoring an amount of the audio information being received by the telephone from the multimedia server, wherein the monitoring step further comprises the step of the telephone sending a congestion message to the multimedia server when the amount of the audio information falls below the predetermined level.

38. The method as recited in claim 37, further comprising the step of the multimedia server sending a throttling signal to the telephone in response to receipt of the congestion message.

39. The method as recited in claim 38, wherein the throttling step operates in response to receipt of the throttling signal.

40. The method as recited in claim 39, wherein the throttling signal includes a mode level.

41. The method as recited in claim 40, wherein the throttling step further comprises the step of adjusting a level of throttling of the data in response to the mode level included in the throttling signal.

42. The method as recited in claim 41, wherein the step of the multimedia server sending a throttling signal to the telephone in response to receipt of the congestion message further comprises the step of setting the mode level to a most aggressive mode, wherein the throttling step will throttle the future amount of data sent from the workstation at a highest level in response to the mode level being in the most aggressive mode.

43. The method as recited in claim 42, wherein the setting step will designate the mode level at the most aggressive mode as long as the congestion message is received from any telephone coupled to the multimedia server within a specified time period.

44. The method as recited in claim 43, wherein the step of the multimedia server sending a throttling signal to the telephone in response to receipt of the congestion message further comprises the step of setting the mode level to a least aggressive mode if the congestion message is not received from any telephone coupled to the multimedia server within the specified time period.

45. The method as recited in claim 44, wherein the throttling step will throttle the future amount of data sent from the workstation at a level lower than the highest level in response to the mode level being in the least aggressive mode.

46. The method as recited in claim 45, wherein the step of the multimedia server sending a throttling signal to the telephone in response to receipt of the congestion message further comprises the step of sending a message to stop the throttling of the future amount of data if the congestion message is not received from any telephone coupled to the multimedia server within the specified time period while the mode level has been in the least aggressive mode.

47. An IP telephony device comprising:
an input data port for receiving data, wherein the data is addressed for transmission to a location other than the IP telephony device;
circuitry for communicating information to and from the IP telephony device;
circuitry for sufficiently throttling the data so that the communication of the information can be performed in real-time, wherein the IP telephony device communicates the information using an IP protocol, wherein the throttling circuitry further comprises circuitry for sending a congestion message from a data output port when the amount of the information being received by the IP telephony device falls below a predetermined level.

48. The IP telephony device as recited in claim 47, wherein the throttling circuitry throttles the future amount of data received at the input data port in response to receipt of a throttling signal at the input data port, wherein the throttling signal is a function of the congestion message.

49. The IP telephony device as recited in claim 48, wherein the throttling signal includes a mode level in which the throttling circuitry should operate.

50. The IP telephony device as recited in claim 49, wherein the throttling circuitry adjusts its level of throttling of the data in response to the mode level included in the throttling signal.

51. The IP telephony device as recited in claim 50, wherein when the mode level is a most aggressive mode, the throttling circuitry will throttle the future amount of data at a highest level in response to the mode level being in the most aggressive mode.

52. The IP telephony device as recited in claim 51, wherein the throttling circuitry will throttle the future amount of data sent from the workstation at a level lower than the highest level in response to the mode level being in a least aggressive mode.

53. The IP telephony device as recited in claim 48, further comprising:
   a microphone;
   a speaker; and
   circuitry for communicating the audio information to the speaker and from the microphone.

54. A multimedia server comprising:
   a network connection for connecting the multimedia server to a data network, wherein the network is a TCP/IP network;
   circuitry operable for communicating audio information with a telephone connected to the data network;
   circuitry operable for sending a throttling signal onto the data network in response to receipt of a congestion message from the data network, wherein the throttling signal includes a mode level, wherein the sending circuitry will designate the mode level at a most aggressive mode as long as the congestion message is received within a specified time period.

55. The multimedia server as recited in claim 54, wherein the network is a packet switched network.

56. The multimedia server as recited in claim 54, wherein the communicating circuitry further comprises circuitry operable for communicating the audio information using an IP protocol.

57. The multimedia server as recited in claim 54, wherein the throttling signal will switch to a least aggressive mode if the congestion message is not received within the specified time period.

58. The multimedia server as recited in claim 57, wherein the throttling signal will contain a stop data throttling signal if the congestion message is not received within the specified time period while the mode level has been in the least aggressive mode.

59. The multimedia server as recited in claim 54, further comprising:
   a peripheral card adaptable for coupling to a telecommunications network.

60. The multimedia server as recited in claim 59, wherein the telecommunications network is a public switched telephone network.

61. The multimedia server as recited in claim 59, further comprising:
   switching circuitry for communicating the audio information between the network connection and the peripheral card.

* * * * *